(12) United States Patent
Hosokawa

(10) Patent No.: US 8,185,656 B2
(45) Date of Patent: May 22, 2012

(54) PROCESS AND COMPUTER FOR COLLECTIVELY TRANSMITTING UNIQUE MESSAGES, AND RECORDING MEDIUM STORING A PROGRAM FOR COLLECTIVELY TRANSMITTING UNIQUE MESSAGES

(75) Inventor: Ikuto Hosokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 522 days.

(21) Appl. No.: 12/535,281

(22) Filed: Aug. 4, 2009

(65) Prior Publication Data

US 2009/0292787 A1 Nov. 26, 2009

Related U.S. Application Data

(63) Continuation of application No. PCT/JP2007/055739, filed on Mar. 20, 2007.

(51) Int. Cl.
*G06F 15/16* (2006.01)
*G06F 15/173* (2006.01)

(52) U.S. Cl. ........ 709/238; 709/206; 709/234; 709/235; 709/239; 709/240; 709/241; 709/242; 709/243; 709/245

(58) Field of Classification Search .................. 709/206, 709/234–235, 238–243, 245
See application file for complete search history.

(56) References Cited

U.S. PATENT DOCUMENTS

| | | | |
|---|---|---|---|
| 5,822,605 A * | 10/1998 | Higuchi et al. ................ | 712/11 |
| 5,826,033 A * | 10/1998 | Hayashi et al. ............... | 709/238 |
| 6,126,331 A | 10/2000 | Komatsu et al. | |
| 7,633,940 B1 * | 12/2009 | Singh et al. ................... | 370/389 |
| 2003/0046512 A1 * | 3/2003 | Ioki et al. .......................... | 712/1 |
| 2003/0191855 A1 * | 10/2003 | Lee et al. ....................... | 709/239 |
| 2004/0160970 A1 * | 8/2004 | Dally et al. .................... | 370/412 |
| 2005/0044195 A1 * | 2/2005 | Westfall ......................... | 709/223 |
| 2005/0100035 A1 * | 5/2005 | Chiou et al. ................... | 370/412 |

FOREIGN PATENT DOCUMENTS

| | | |
|---|---|---|
| EP | 0 544 532 A2 | 6/1993 |
| EP | 1 293 902 A2 | 3/2003 |
| JP | A 63-198150 | 8/1988 |
| JP | A 4-235654 | 8/1992 |
| JP | A 5-151181 | 6/1993 |
| JP | A 7-262155 | 10/1995 |
| JP | A 9-330304 | 12/1997 |
| JP | A 2003-67354 | 3/2003 |

\* cited by examiner

*Primary Examiner* — Kevin Bates
*Assistant Examiner* — Mohammed Ahmed
(74) *Attorney, Agent, or Firm* — Greer, Burns & Crain, Ltd.

(57) ABSTRACT

A recording medium storing a program for performing collective communication of unique-messages by a computer. According to the program, a space in which nodes are arranged is equally split into regions according to directions from the origin of a relative coordinate system, and a region to which each node belongs is determined on the basis of the relative coordinates of the node. When the computer receives an instruction to execute collective communication of unique-messages, messages are submitted to nodes in turns so that the numbers of messages addressed to the respective regions and submitted per predetermined unit time are equated, and each message submitted to one of the nodes contains data unique to the node.

14 Claims, 21 Drawing Sheets

1st Quadrant

Legend:  Priority of Submission

Node

| Cycle | 1 | | | | 2 | | | | 3 | | | | 4 | | | | 5 | | | |
|---|---|---|---|---|---|---|---|---|---|---|---|---|---|---|---|---|---|---|---|---|
| Hop Direction | x+ | x- | y+ | y- | x+ | x- | y+ | y- | x+ | x- | y+ | y- | x+ | x- | y+ | y- | x+ | x- | y+ | y- |
| 1st Quadrant | 0 | 0 | 0 | 0 | 1 | 0 | 0 | 0 | 0 | 0 | 1 | 0 | 2 | 0 | 0 | 0 | 1 | 0 | 1 | 0 |
| 2nd Quadrant | 0 | 3 | 2 | 0 | 0 | 2 | 2 | 0 | 0 | 3 | 1 | 0 | 0 | 1 | 2 | 0 | 0 | 2 | 1 | 0 |
| 3rd Quadrant | 0 | 1 | 0 | 1 | 0 | 2 | 0 | 0 | 0 | 1 | 0 | 2 | 0 | 3 | 0 | 1 | 0 | 2 | 0 | 2 |
| 4th Quadrant | 2 | 0 | 0 | 3 | 1 | 0 | 0 | 3 | 2 | 0 | 0 | 2 | 0 | 0 | 0 | 3 | 1 | 0 | 0 | 2 |
| Subtotal | 2 | 4 | 2 | 4 | 2 | 4 | 2 | 4 | 2 | 4 | 2 | 4 | 2 | 4 | 2 | 4 | 2 | 4 | 2 | 4 |
| Total | 12 | | | | 12 | | | | 12 | | | | 12 | | | | 12 | | | |

| Cycle | 6 | | | | 7 | | | | 8 | | | | 9 | | | |
|---|---|---|---|---|---|---|---|---|---|---|---|---|---|---|---|---|
| Hop Direction | x+ | x- | y+ | y- | x+ | x- | y+ | y- | x+ | x- | y+ | y- | x+ | x- | y+ | y- |
| 1st Quadrant | 0 | 0 | 2 | 0 | 2 | 0 | 1 | 0 | 1 | 0 | 2 | 0 | 2 | 0 | 2 | 0 |
| 2nd Quadrant | 0 | 3 | 0 | 0 | 0 | 1 | 1 | 0 | 0 | 2 | 0 | 0 | 0 | 1 | 0 | 0 |
| 3rd Quadrant | 0 | 1 | 0 | 3 | 0 | 3 | 0 | 2 | 1 | 2 | 0 | 3 | 0 | 3 | 0 | 3 |
| 4th Quadrant | 2 | 0 | 0 | 1 | 0 | 0 | 0 | 2 | 0 | 0 | 2 | 1 | 0 | 0 | 0 | 1 |
| Subtotal | 2 | 4 | 2 | 4 | 2 | 4 | 2 | 4 | 2 | 4 | 2 | 4 | 2 | 4 | 2 | 4 |
| Total | 12 | | | | 12 | | | | 12 | | | | 12 | | | |

| Cycle | 1 | | | | 2 | | | | 3 | | | | 4 | | | | 5 | | | |
|---|---|---|---|---|---|---|---|---|---|---|---|---|---|---|---|---|---|---|---|---|
| Hop Direction | x+ | x- | y+ | y- | x+ | x- | y+ | y- | x+ | x- | y+ | y- | x+ | x- | y+ | y- | x+ | x- | y+ | y- |
| 1st Quadrant | 0 | 0 | 0 | 0 | 2 | 0 | 2 | 0 | 0.5 | 0 | 0 | 0 | 1 | 0 | 2 | 0 | 0 | 0 | 0.5 | 0 |
| 2nd Quadrant | 0 | 1 | 0 | 0 | 0 | 0 | 1 | 0 | 0 | 0.5 | 0 | 0 | 0 | 1 | 2 | 0 | 0 | 2 | 1 | 0 |
| 3rd Quadrant | 0 | 2 | 0 | 2 | 0 | 0 | 0 | 0 | 0 | 1 | 0 | 2 | 0 | 0.5 | 2 | 0 | 0 | 2 | 0 | 1 |
| 4th Quadrant | 0 | 0 | 0 | 1 | 1 | 0 | 0 | 0 | 1 | 0 | 0 | 2 | 0.5 | 0 | 0 | 0 | 0 | 0 | 0 | 0.5 |
| Subtotal | 0 | 3 | 0 | 3 | 3 | 0 | 3 | 0 | 1.5 | 1.5 | 0 | 4 | 1.5 | 1.5 | 4 | 0 | 0 | 4 | 1.5 | 1.5 |
| Total | 6 | | | | 6 | | | | 7 | | | | 7 | | | | 7 | | | |

| Cycle | 6 | | | | 7 | | | | 8 | | | | 9 | | | |
|---|---|---|---|---|---|---|---|---|---|---|---|---|---|---|---|---|
| Hop Direction | x+ | x- | y+ | y- | x+ | x- | y+ | y- | x+ | x- | y+ | y- | x+ | x- | y+ | y- |
| 1st Quadrant | 2 | 0 | 1 | 0 | 1 | 0 | 0 | 0 | 0 | 0 | 1 | 0 | 1 | 0 | 1 | 0 |
| 2nd Quadrant | 0 | 0 | 0.5 | 0 | 0 | 0 | 0 | 0 | 0 | 2 | 2 | 0 | 0 | 1 | 1 | 0 |
| 3rd Quadrant | 0 | 0 | 0 | 0.5 | 0 | 0 | 0 | 1 | 0 | 1 | 0 | 0 | 0 | 1 | 0 | 1 |
| 4th Quadrant | 2 | 0 | 0 | 1 | 2 | 0 | 0 | 2 | 0 | 3 | 3 | 0 | 1 | 0 | 0 | 1 |
| Subtotal | 4 | 0 | 1.5 | 1.5 | 3 | 0 | 0 | 3 | 0 | 3 | 3 | 0 | 2 | 2 | 2 | 2 |
| Total | 7 | | | | 6 | | | | 6 | | | | 8 | | | |

FIG. 13

449b OPERATIONAL-INFORMATION STORAGE

449c BANDWIDTH-INFORMATION TABLE

| Transmission Line | Bandwidth |
|---|---|
| (0, 0)→(0, 1) | 400Mbps |
| (0, 1)→(0, 2) | 200Mbps |
| ⋮ | ⋮ |

449d FAILURE-INFORMATION TABLE

| Node | Status |
|---|---|
| (0, 0) | In Operation |
| (0, 1) | In Operation |
| ⋮ | ⋮ |

FIG. 16

PROCESS AND COMPUTER FOR COLLECTIVELY TRANSMITTING UNIQUE MESSAGES, AND RECORDING MEDIUM STORING A PROGRAM FOR COLLECTIVELY TRANSMITTING UNIQUE MESSAGES

This application is a continuing application, filed under 35 U.S.C. Section 111(a), of International Application PCT/JP2007/055739, filed Mar. 20, 2007.

FIELD

The embodiments discussed herein relate to a process for collectively transmitting unique messages by a computer which behaves as a node in a torus network, a computer which collectively transmits unique messages, and a recording medium which stores a program for collective transmission of unique messages.

BACKGROUND

When massive calculation such as scientific calculation is performed by one or more computers, the calculation time can be reduced by performing the calculation by a plurality of computers in parallel. In the case where a plurality of computers perform parallel processing, the data communication efficiency between the computers greatly affects the overall processing efficiency. Therefore, the simple mesh or torus networks are considered for use as an interconnecting network realizing efficient data communication. In a system constituted by a plurality of computers, each computer is referred to as a node.

In the mesh network, nodes are respectively arranged at grid points on a grid (mesh) structure formed with the transmission lines. In the two-dimensional torus network, nodes located at opposite ends of the series of nodes arrayed along each of the longitudinal direction and the lateral direction on the mesh network are connected through transmission lines, respectively. In the mesh or torus networks, messages containing communication data are relayed by nodes in a manner like a bucket relay. In the bucket-relay communication, when each node receives a message, the node forwards the message to an adjacent node located on the destination side (i.e., performs routing). At this time, each node determines, by itself, a route through which the message can be transmitted most efficiently, and forwards the message through the determined route. For example, according to a known technique, each processor performing routing determines the next hop on the basis of the amounts of load imposed on processors surrounding the processor performing routing so that the amounts of load imposed on all the processors are equated. (See, for example, Japanese Laid-open Patent Publication No. 63-198150.)

Incidentally, in computer systems in which nodes are connected in a mesh or torus network, collective communication (e.g., one-to-many or many-to-many communication) can occur. Specifically, in the broadcast, scatter, and all-to-all communication processes, data is transmitted from one node to all the other nodes. In the broadcast process, identical message is transmitted to many nodes. The broadcast process can be completed by inserting preferable data in a message, and transmitting the message, for example, in a bucket-relay manner.

However, in the collective communications such as the scatter or all-to-all communication, a great number of messages are transmitted, so that congestion can occur in some communication path in the network. In the scatter communication, a node transmits individual data to each of a plurality of nodes. In the all-to-all communication, all nodes perform scatter communication. The scatter communication and the all-to-all communication are different from the broadcast communication in that unique messages are transmitted from each source to each destination. Hereinafter, the collective communications such as the scatter communication and the all-to-all communication are referred to as collective communication of unique-messages.

For example, when collective communication of unique-messages is performed in an n-parallel computer system constituted by n nodes arranged in a mesh or torus network, n bucket-relay transmitting operations occur in the scatter communication, and $n^2$ bucket-relay transmitting operations occur in the all-to-all communication. Therefore, when massive data communication is randomly started, load concentration and congestion can occur in some communication path. When the congestion occurs, the time until completion of the collective communication increases. This problem becomes conspicuous in the all-to-all (many-to-many) communication.

Conventionally, no technique has been proposed for efficiently balancing communication loads which occur in collective communication of unique-messages performed in a parallel computer system constituted by a simple mesh or torus network. Therefore, load concentration often occurs in the conventional parallel computer systems constituted by a simple mesh or torus network when collective communication of unique-messages is performed.

SUMMARY

According to an aspect of the present invention, a recording medium which stores a program for performing collective communication of unique-messages by a computer which behaves as one of a plurality of nodes in a torus network is provided, where data unique to each of ones of the plurality of nodes in the torus network other than the one of the plurality of nodes is transmitted to the node in the collective communication of unique-messages. The program realizes in the computer: a region determination function which acquires the system-configurational information from a configurational-information storage which stores system-configurational information indicating absolute coordinates of each of the plurality of nodes in the torus network, equally splits a space into regions according to directions from an origin of a relative coordinate system on the basis of the system-configurational information, determines one of the regions to which each of the plurality of nodes belongs, on the basis of the relative coordinates of the node, produces regional information indicating the relative coordinates of each of the plurality of nodes and the region to which each of the plurality of nodes belongs, and stores the regional information in a regional-information storage, where the origin of the relative coordinate system is placed at a location of the computer; the regional-information storage which stores the regional information; and a communication execution function which refers to the regional-information storage, and executes submission of messages to the ones of the plurality of nodes in turns in such a manner that the numbers of messages addressed to the respective regions and transmitted per predetermined unit time are equated, and each of the messages transmitted to one of the ones of the plurality of nodes contains data unique to the one of the ones of the plurality of nodes, when the computer receives an instruction to execute collective communication of unique-messages.

The objects and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF DRAWING(S)

FIG. 11 illustrates an example of load balancing in communications performed on the basis of the intra-region order information;

FIG. 13 illustrates an example of load balancing in communications performed on the basis of the intra-region order information indicated in FIG. 12;

FIG. 16 illustrates an example of a data structure in an operational information storage;

DESCRIPTION OF EMBODIMENT(S)

The embodiments will be explained below with reference to the accompanying drawings, wherein like reference numbers refer to like elements throughout.

Outline of Typical Construction

Figure 1:
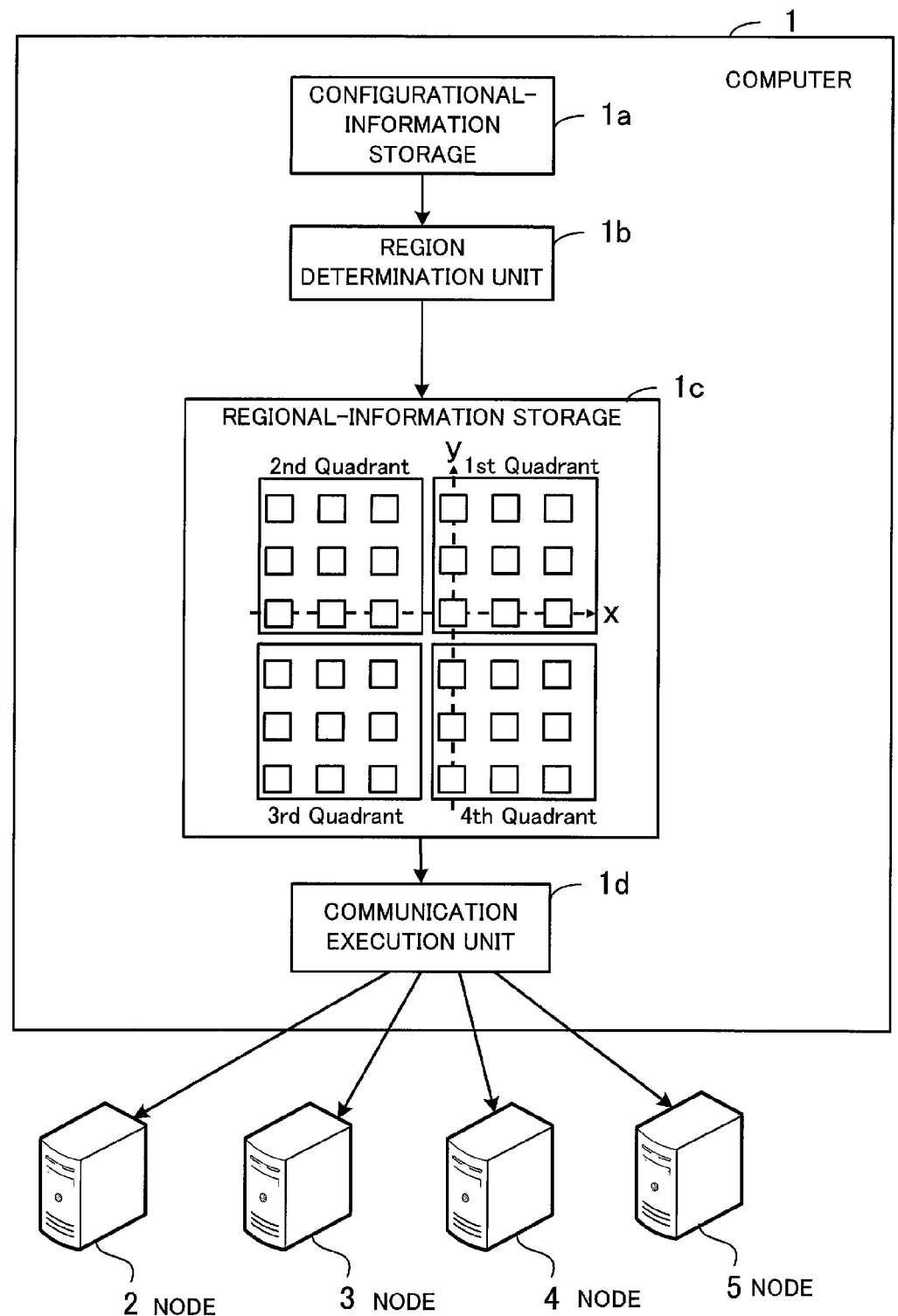
FIG. 1 illustrates functions realized in a typical computer presented for use in a node of a network.

FIG. 1 illustrates the functions realized in a typical computer presented for use in a node of a network, which is, for example, a torus network. The computer 1 comprises a configurational-information storage 1a, a region determination unit 1b, a regional-information storage 1c, and a communication execution unit 1d.

The configurational-information storage 1a stores system-configurational information indicating the absolute coordinates of each node belonging to the torus network, as well as the absolute coordinates of the computer 1. For example, the configurational-information storage 1a may be arranged in the working memory (work area) of the computer 1. The region determination unit 1b equally splits the entire area in which all the nodes belonging to the torus network are arranged, into a plurality of regions according to the direction from the origin of a relative coordinate system on the basis of the system-configurational information, where the origin of the relative coordinate system is placed at the location of the computer 1. Then, the region determination unit 1b determines the region to which each node belongs, on the basis of the relative coordinates of the node, and produces regional information, which indicates the relative coordinates of each node and the region to which the node belongs. The regional-information storage 1c stores the regional information produced by the region determination unit 1b. For example, the regional-information storage 1c may be arranged in the working memory (work area) of the computer 1.

When an instruction to execute the collective communication of unique-messages is inputted into the computer 1, the communication execution unit 1d refers to the regional-information storage 1c, and executes processing for transmitting, in turns, to each of the nodes a message containing data unique to the node (unique data) in such a manner that the numbers of messages addressed to the respective regions and transmitted per (predetermined) unit time are equated (for example, equated to one).

When the computer 1 executes a program for performing collective transmission of unique messages, the region determination unit 1b equally splits the entire area in which all the nodes are distributed, into a plurality of regions according to the direction from the origin of the relative coordinate system on the basis of the system-configurational information, and determines the region to which each node belongs, on the basis of the relative coordinates of the node. Thereafter, when an instruction to execute the collective communication of unique-messages is inputted into the computer 1, the communication execution unit 1d executes processing for submitting or transmitting, in turns, to each of the nodes a message containing data unique to the node in such a manner that the numbers of messages addressed to the respective regions and transmitted per (predetermined) unit time are equated. For example, in the case where the nodes 2 to 5 are located adjacent to the computer 1, the message to be transmitted to a destination in one of the regions is forwarded to one of the nodes 2 to 5 located in a route through which the message can be transmitted to the destination by the minimum number of hops. The number of hops (or hop count) is the number of forwarding operations performed during transmission from a source to a destination.

Since the computer 1 operates as above in the collective communication of unique-messages, the numbers of messages addressed to the respective regions and submitted or transmitted from the computer 1 per unit time in the collective communication of unique-messages are equated, so that it is possible to suppress occurrence of congestion in the transmission lines. That is, in a parallel computer system constituted by a torus network in which a computer node is arranged at each grid point, it is possible to realize collective communication of unique-messages by performing one-to-one communication between a source node and all the other nodes. At this time, the communication loads can be balanced by uniformizing, along each of the spatial axes and the time axis, the traffic of message transmissions addressed to nodes in all the regions (located in various directions from the source node).

In order to uniformize the traffic of message transmissions along the spatial axes, it is possible to utilize the fact that each grid point of the torus network can be identified by the relative coordinates with respect to the origin, which may be the position of an arbitrary one of the grid points of the torus network. Therefore, it is sufficient to consider a load balancing technique based on a relative coordinate system having the origin at the position of an arbitrary node. The technique explained with reference to FIG. 1 is an example of the above load balancing technique. As explained before, according to the technique explained with reference to FIG. 1, an arbitrary computer node is determined to be a source node, all the nodes surrounding the source node are equally grouped into two or more groups (i.e., the entire area in which all the nodes are distributed are equally split into two or more regions), and the numbers of one-to-one communications addressed to the respective regions and performed per unit time are equated. Therefore, it is possible to prevent concentration of message transmissions addressed to any of the regions located in a direction from the source node. That is, the communication loads can be spatially balanced.

In addition, the communication loads can also be uniformized along the time axis. In the case where the bandwidths (i.e., the transmission rates) of the transmission lines connecting between adjacent nodes are equal, the total path length of transmission lines occupied in each transmitting operation from a source to a destination increases in proportion to the number of hops in the transmitting operation. Therefore, it is possible to consider that the numbers of hops are regarded as weights in the communication loads, and the communication loads can be balanced along the time axis when the total number of hops in one or more transmitting operations performed per unit time is equated.

Specifically, first, the priorities of the message submissions to the computer nodes in each of the regions are determined on the basis of the number of hops in one-to-one transmission from the source node to each computer node. Then, the one-to-one transmissions to the computer nodes are divided into first and second halves so that the first half of the one-to-one transmissions to the computer nodes in each region can be performed in ascending order of the number of hops, and the second half of the one-to-one transmissions to the computer nodes in each region can be performed in descending orders of the number of hops. Thereafter, messages are transmitted to the computer nodes so that the total number of hops in one or more transmitting operations addressed to each region performed per unit time is equated. That is, the total number of hops performed per (very short) unit time becomes uniform.

It is possible to determine the order of submission to the computer nodes in one or more of the regions other than one or more representative regions by one or a combination of flipping (line-symmetry transformation), rotation, and shifting (translation) of the one or more traces of computer nodes scanned in the orders of submission to nodes in the one or more representative regions. Even in this case, it is possible to uniformize the total number of hops per unit time. In particular, in the case where a representative region is symmetric with respect to a coordinate axis, to a region in which the order of submission is determined by use of the order of submission in the representative region as described above, it is possible to equate the total numbers of hops per unit time in the regions located on both sides of the coordinate axis. In the above case, the order of submission to computer nodes in the one or more representative regions may be determined by selecting the computer nodes alternately in ascending and descending order of the number of hops, instead of selecting the computer nodes simply in ascending or descending order of the number of hops.

In the case where the bandwidths (i.e., the transmission rates) of the transmission lines connecting between the nodes are not equal, it is possible to define as a virtual hop value a value corresponding to the bandwidth of each transmission line, and define as an effective hop count the sum of the virtual hop values of the transmission lines used in each operation of transmitting a message from a source to a destination, as expressed by the formula, $$\text{Effective Hop Count} = \sum_i 1/w_i,$$

where i is an index for identifying each transmission line constituting the communication path from the source to the destination, and is equal to or greater than one and equal to or smaller than the number of hops in the transmitting operation, and $w_i$ is the bandwidth of the i-th transmission line. In the above case, the virtual hop value of each transmission line is smaller when the bandwidth of the transmission line is greater. Thus, when the effective hop count defined as above, instead of the total number of hops, is used in the determination of the order of submission to the computer nodes, the aforementioned technique of determining the order of submission to computer nodes and performing the transmissions on the basis of the determined order can be used even in the case where the bandwidths (i.e., the transmission rates) of the transmission lines connecting between adjacent nodes are not equal.

Hereinbelow, the embodiments, in which the techniques explained above are used in combination, are explained in detail.

First Embodiment

The first embodiment is explained below.

System Configuration

Figure 2:
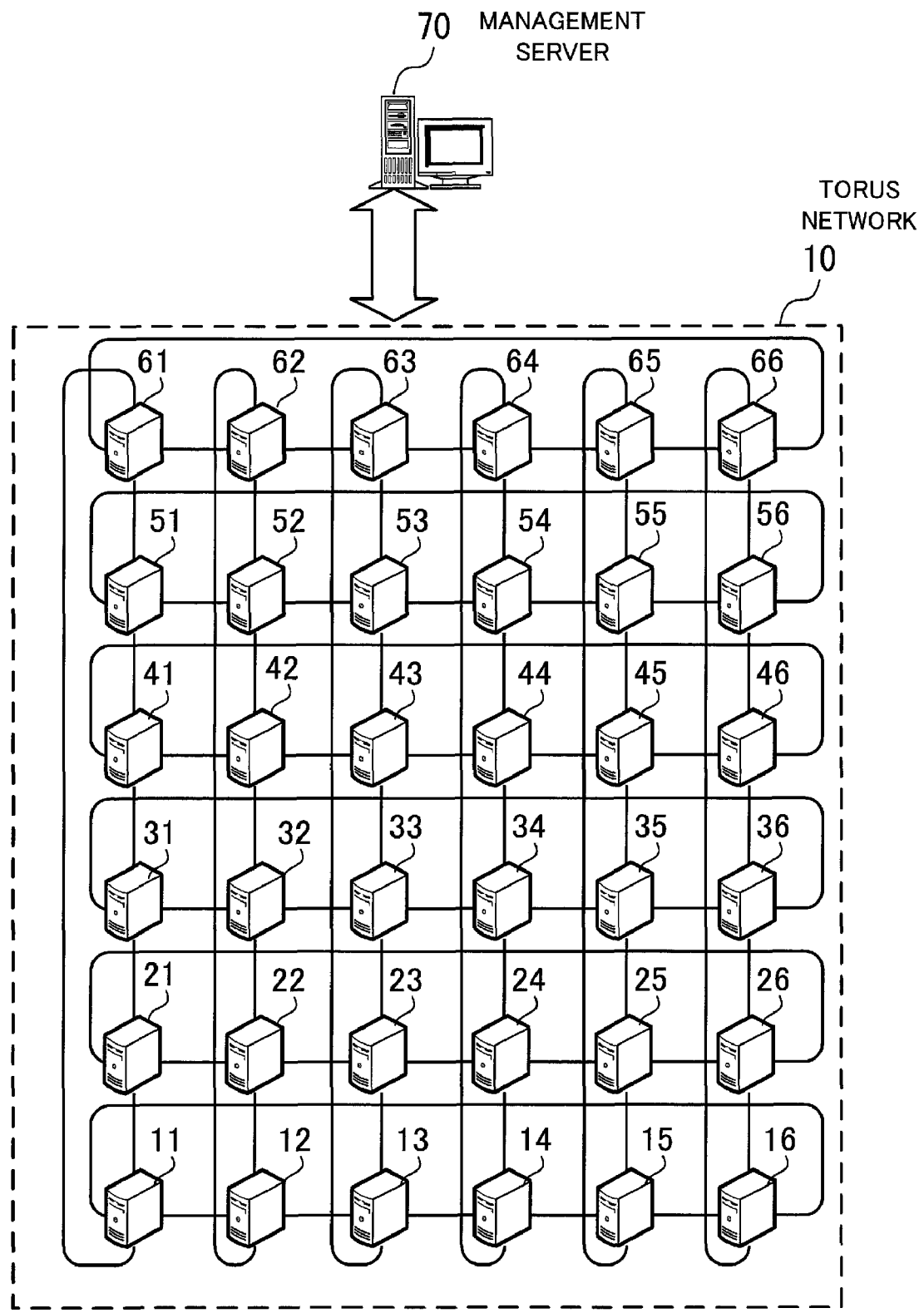
FIG. 2 illustrates an example of a configuration of a computer system according to the first embodiment.

FIG. 2 illustrates an example of the configuration of the computer system according to the first embodiment. The computer system according to the first embodiment is constituted by a torus network 10 and a management server 70. The torus network 10 is constituted by a plurality of nodes, and the management server 70 manages the torus network 10.

In the example of FIG. 2, the torus network 10 is a 6×6 two-dimensional torus network, and is constituted by 36 nodes 11 to 16, 21 to 26, 31 to 36, 41, to 46, 51 to 56, and 61 to 66. The nodes 11 to 16 are arranged along a row in the torus network 10, and adjacent ones of the nodes 11 to 16 are interconnected through a high-speed transmission line such as an optical transmission line. In addition, the nodes 11 and 16 at the opposite ends of the row are also connected through a high-speed transmission line. Further, the nodes in each of the group of the nodes 21 to 26, the group of the nodes 31 to 36, the group of the nodes 41, to 46, the group of the nodes 51 to 56, and the group of the nodes 61 to 66 are also interconnected in a similar manner to the nodes 11 to 16.

The nodes 11, 21, 31, 41, 51, and 61 are arranged along a column in the torus network 10, and adjacent ones of the nodes 11, 21, 31, 41, 51, and 61 are interconnected through a high-speed transmission line such as an optical transmission line. In addition, the nodes 11 and 61 at the opposite ends of the column are also connected through a high-speed transmission line. Further, the nodes in each of the group of the nodes 12, 22, 32, 42, 52, and 62, the group of the nodes 13, 23, 33, 43, 53, and 63, the group of the nodes 14, 24, 34, 44, 54, and 64, the group of the nodes 15, 25, 35, 45, 55, and 65, and the group of the nodes 16, 26, 36, 46, 56, and 66 are also interconnected in a similar manner to the nodes 11, 21, 31, 41, 51, and 61.

As described above, ones of the nodes arranged adjacent to each other along each of the longitudinal and lateral directions are interconnected through a high-speed transmission line, and the nodes at the opposite ends of each of the rows and the columns of the torus network 10 are also connected through a high-speed transmission line. Thus, the nodes in the torus network 10 execute jobs respectively assigned to the nodes in parallel and in cooperation with each other, so that the computer system of FIG. 2 can perform high-speed processing.

The management server 70 is connected to each of the nodes in the torus network 10, and can supply to each of the nodes an instruction to execute a job. In addition, when the system is started up, the management server 70 supplies to each of the nodes system-configurational information and the addresses of the nodes.

Hardware of Management Server

Figure 3:
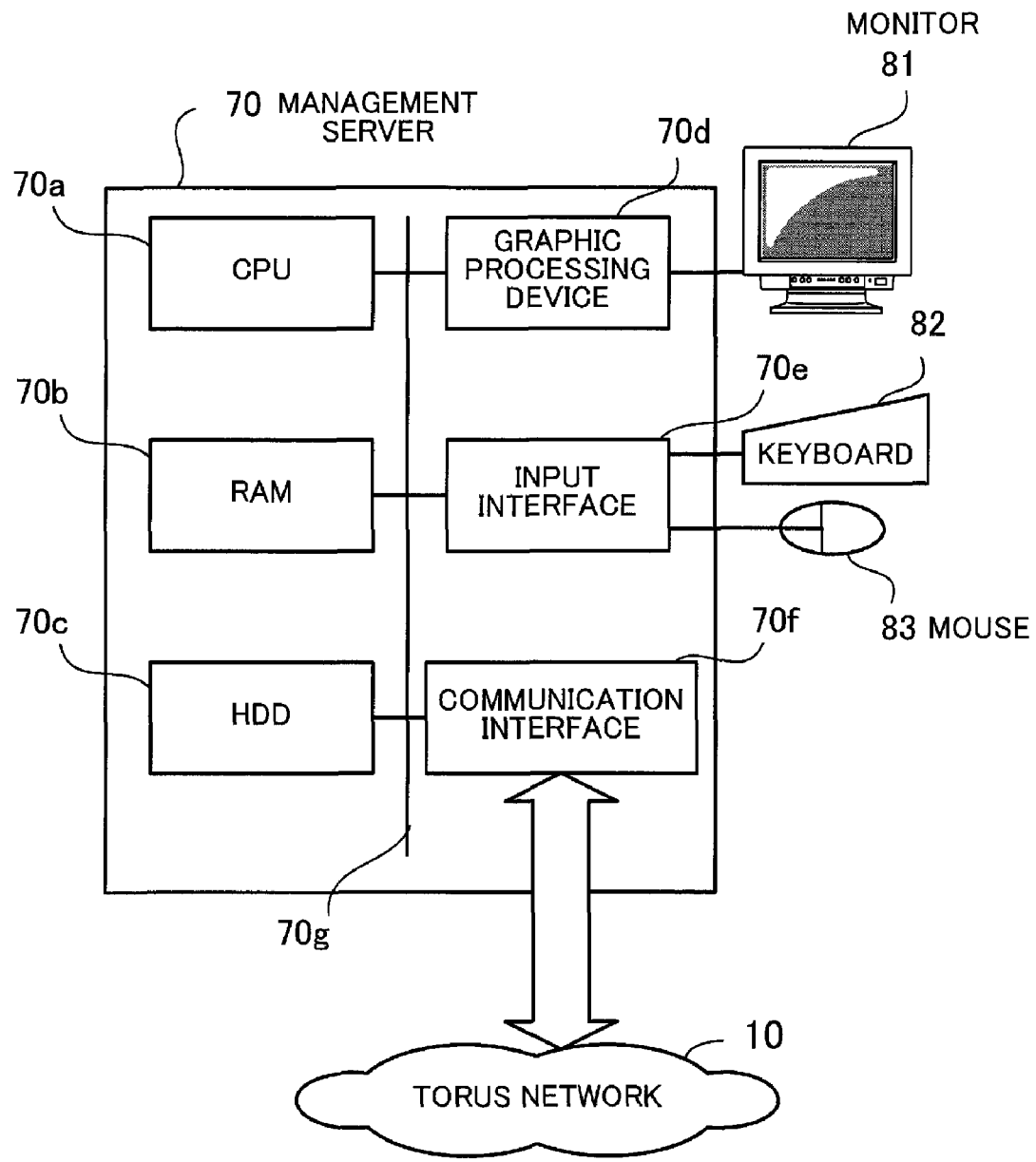
FIG. 3 illustrates an example of a hardware construction of a management server according to the first embodiment.

FIG. 3 illustrates an example of a hardware construction of the management server 70. The entire management server 70 is controlled by a CPU (central processing unit) 70a, to which a RAM (random access memory) 70b, an HDD (hard disk drive) 70c, a graphic processing unit 70d, an input interface 70e, and a communication interface 70f are connected through a bus 70g. The RAM 70b temporarily stores at least portions of an OS (operating system) program and application programs which are executed by the CPU 70a, as well as various types of data preferable for processing by the CPU 70a. The HDD 70c stores the OS program and the application programs. A monitor 81 is connected to the graphic processing unit 70d, which makes the monitor 81 display an image on a screen in accordance with an instruction from the CPU 70a. A keyboard 82 and a mouse 83 are connected to the input interface 70e, which transmits signals sent from the keyboard 82 and the mouse 83, to the CPU 70a through the bus 70g. The communication interface 70f is connected to the management server 70, and exchanges data with other computers through the torus network 10.

Hardware of Nodes

Figure 4:
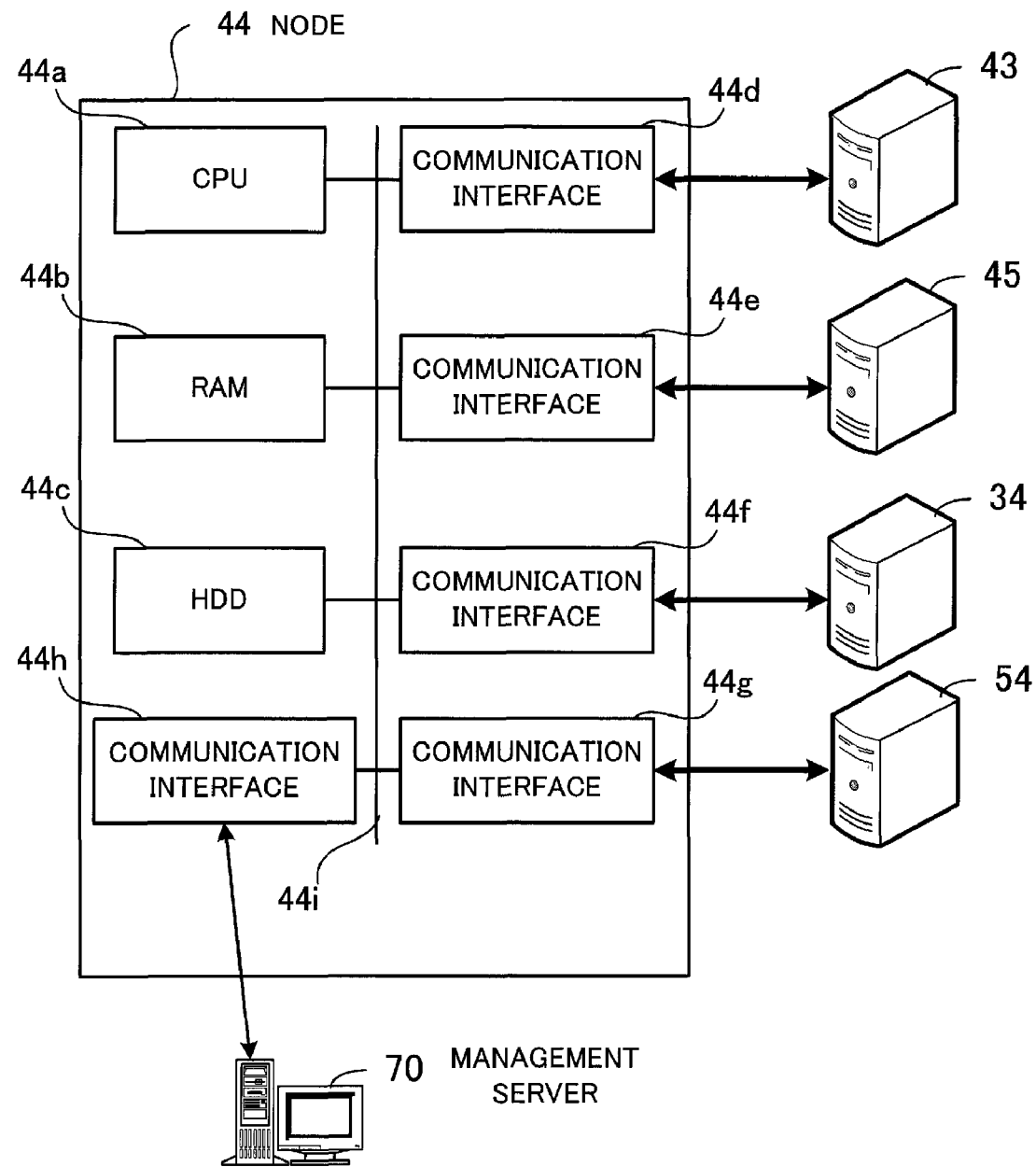
FIG. 4 illustrates an example of a hardware construction of a node constituting a torus network.

FIG. 4 illustrates an example of a hardware construction of the node 44 as a representative of the nodes in the torus network 10. The node 44 is controlled by a CPU (central processing unit) 44a, to which a RAM (random access memory) 44b, a HDD (hard disk drive) 44c, and communication interfaces 44d, 44e, 44f, 44g, and 44h are connected through a bus 44i. The RAM 44b temporarily stores at least portions of an OS (operating system) program and application programs which are executed by the CPU 44a, as well as various types of data preferable for processing by the CPU 44a. The HDD 44c stores the OS program and the application programs. The communication interfaces 44d, 44e, 44f, 44g, and 44h are connected to the nodes 43, 45, 34, and 54 through transmission lines, respectively, and exchange data with the connected nodes.

The communication interface 44h is connected to the management server 70 through a network arranged for management, and exchange data with the management server 70.

Further, the nodes constituting the torus network 10 other than the node 44 can also be realized with the hardware construction of FIG. 4.

When the management server 70 and the nodes in the torus network 10 are realized with the above hardware constructions, the processing functions of the first embodiment can be realized as explained in detail below.

Functions of Management Server and Nodes

Figure 5:
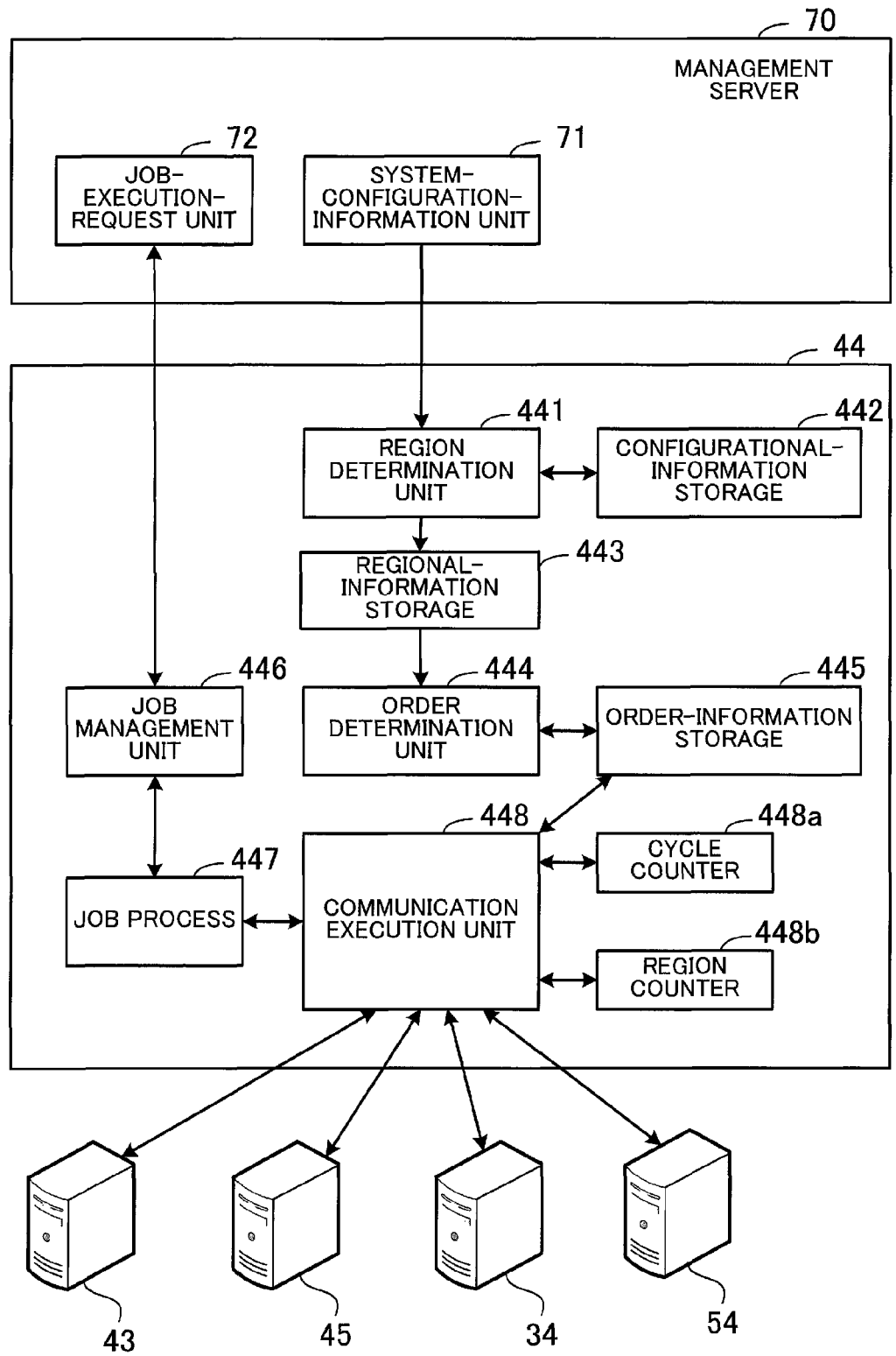
FIG. 5 is a block diagram illustrating the functions of the management server and the node according to the first embodiment.

FIG. 5 is a block diagram illustrating the functions of the management server and the node according to the first embodiment. The management server 70 comprises a system-configuration-information unit 71 and a job-execution-request unit 72.

When each node is started up, the system-configuration-information unit 71 supplies system-configurational information on the torus network 10 to the started node. The system-configurational information includes the addresses of the started node and the other nodes. For example, the system-configuration-information unit 71 receives a command inputted by an operations administrator when the nodes in the torus network 10 are started. Then, the system-configuration-information unit 71 transmits the system-configurational information to the nodes on the basis of the command.

The job-execution-request unit 72 transmits to each node a request to execute a job. Specifically, the job-execution-request unit 72 receives an instruction to input a job, for example, from the operations administrator. The instruction to input a job includes the number of nodes preferable for execution of the job. Then, the job-execution-request unit 72 selects one or more nodes corresponding to the number preferable for execution of the job, from among one or more nodes which constitute the torus network 10 and are not currently executing a job. Thereafter, the job-execution-request unit 72 transmits a request to execute the job to the selected nodes.

The node 44 comprises a region determination unit 441, a configurational-information storage 442, a regional-information storage 443, an order determination unit 444, an order-information storage 445, a job management unit 446, a job process 447, a communication execution unit 448, a cycle counter 448a, and a region counter 448b.

In order to perform collective communication of unique-messages with each of the nodes other than the node 44 when the node 44 is the source node, the region determination unit 441 determines a region to which each of the nodes other than the node 44 belongs. Specifically, the region determination unit 441 stores in the configurational-information storage 442 the system-configurational information transmitted from the management server 70, and then determines a region to which each of the nodes other than the node 44 belongs, on the basis of the absolute coordinates of the node 44 and the other nodes. The region is defined on a two-dimensional plane. Thereafter, the region determination unit 441 produces regional information and stores the regional information in the regional-information storage 443, where the regional information indicates the relative coordinates of each of the other nodes with respect to the position of the node 44 and the region to which each of the other nodes belongs to.

The configurational-information storage 442 is a storage area for storing the system-configurational information. For example, a portion of the storage area of the RAM 44b may be used as the configurational-information storage 442.

The regional-information storage 443 is a storage area for storing the regional information. For example, a portion of the storage area of the RAM 44b may be used as the regional-information storage 443.

The order determination unit 444 determines the order of submission to the nodes other than the node 44 as destinations in each region (i.e., the priorities of the message submissions to the nodes in each region), on the basis of the regional information produced by the region determination unit 441. The algorithm for determining the order is defined in advance in the order determination unit 444. Then, the order determination unit 444 produces intra-region order information, and stores the intra-region order information in the order-information storage 445, where the intra-region order information indicates the order of submission to the nodes in each region as determined above.

The order-information storage 445 is a storage area for storing the intra-region order information. For example, a portion of the storage area of the RAM 44b may be used as the order-information storage 445. In the first embodiment, the intra-region order information includes information indicating the region to which each node belongs. Therefore, when collective communication of unique-messages is performed, the relative coordinates of each node, the region to which each node belongs, and the order of submission to be performed in the region to which each node belongs can be recognized by referring to the intra-region order information.

The job management unit 446 makes the job process 447 execute a job in accordance with a request to execute the job, where the request is transmitted from the management server 70. At this time, a program describing the processing functions of the job to be executed may be read out from, for example, the HDD 44c. In this case, the job management unit 446 imparts a command to the OS (operating system) of the node 44, where the command indicates an execution request in which the above program stored in the HDD 44c is designated. In addition, the job management unit 446 designates as arguments variables and the like in accordance with a job-execution condition indicated in the request to execute the job. Thus, the OS starts the job process 447.

The job process 447 executes data processing in accordance with the program which is designated when the job process 447 is started. That is, the job process 447 successively executes instructions indicated in the program. When the job process 447 executes a parallel job, the job process 447 executes processing in cooperation with one or more job processes operating on one or more other nodes.

In the case where an instruction to be executed instructs to perform collective communication of unique-messages, the job process 447 requests the communication execution unit 448 to execute the collective communication of unique-messages. For example, it is possible to define in advance in the OS a function for calling the communication execution unit 448. In this case, when the job process 447 calls the function for calling the communication execution unit 448, the OS starts the communication execution unit 448. In addition, when the job process 447 requests the communication execution unit 448 to execute the collective communication of unique-messages, the job process 447 passes to the communication execution unit 448 data unique to each node (i.e., data to be sent to each node by the collective communication of unique-messages).

When the communication execution unit 448 receives from the job process 447 a request to execute collective communication of unique-messages, the communication execution unit 448 transmits to each of the other nodes messages unique to the nodes as the destination of the messages. Specifically, the communication execution unit 448 refers to a region management table stored in the order-information storage 445 and acquires information indicating the region to which each of the other nodes belongs and the order of message submission to the nodes in the region. Then, in each submission cycle (the duration of which corresponds to a unit time), the communication execution unit 448 submits or transmits a message to a node to which the current submission cycle (transmission cycle) is allocated. The unit time is predetermined as a duration preferable for submitting of a message to every region. Each message contains data unique to a node to which the message is submitted. When each message is submitted, the communication execution unit 448 determines what number from the beginning of the collective communication of unique-messages the current submission cycle is, by using the cycle counter 448a. In addition, the communication execution unit 448 determines the region to which the next destination node in the current submission cycle belongs, by using the region counter 448b, where the next destination node in the current submission cycle is the node to which the next message is to be submitted in the current submission cycle.

The cycle counter 448a is a storage area in which the number of submission cycles counted from the beginning of each sequence of collective communication of unique-messages is stored. For example, a portion of the storage area of the RAM 44b may be used as the cycle counter 448a.

The region counter 448b is a storage area in which a value indicating the region to which the next destination node in the current submission cycle belongs is stored. For example, a portion of the storage area of the RAM 44b may be used as the region counter 448b.

Examples of Processing

Hereinbelow, details of processing according to the first embodiment are explained.

Figure 6:
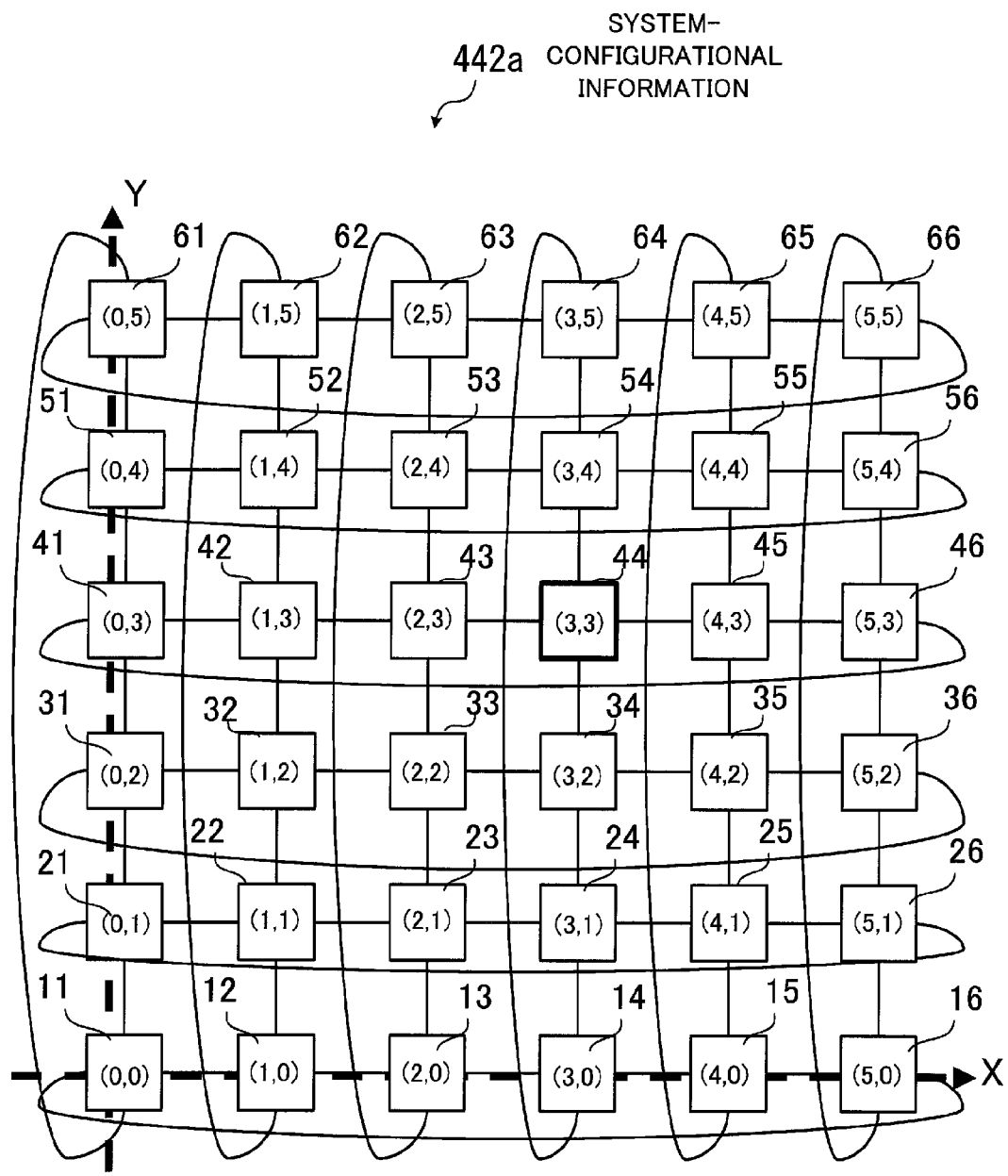
FIG. 6 illustrates an example of system-configurational information.

FIG. 6 illustrates an example 442a of the system-configurational information. The system-configurational information 442a indicates the absolute coordinates of each node. In FIG. 6, the absolute coordinates of each node is indicated in a block representing the node. In the example of FIG. 6, the absolute coordinates of the nodes in the 6×6 two-dimensional torus network 10 are indicated by the (x, y) coordinates. Specifically, the absolute x-coordinate of each node is indicated by one of the integers of 0 to 5, and the absolute y-coordinate of each node is also indicated by one of the integers of 0 to 5. For example, the node 11 is arranged at the absolute coordinates (0, 0) and the node 44 is arranged at the absolute coordinates (3, 3).

According to the first embodiment, each of the nodes is informed of the coordinates of the other nodes. Therefore, when a message with a designation of the coordinates of the destination is submitted, one or more nodes existing between the source and the destination forward the message toward the designated coordinates of the destination. Specifically, each of the one or more nodes existing between the source and the destination forwards the message to one of the adjacent nodes which is nearer to the destination on the basis of the arrangement of the nodes.

Figure 7:
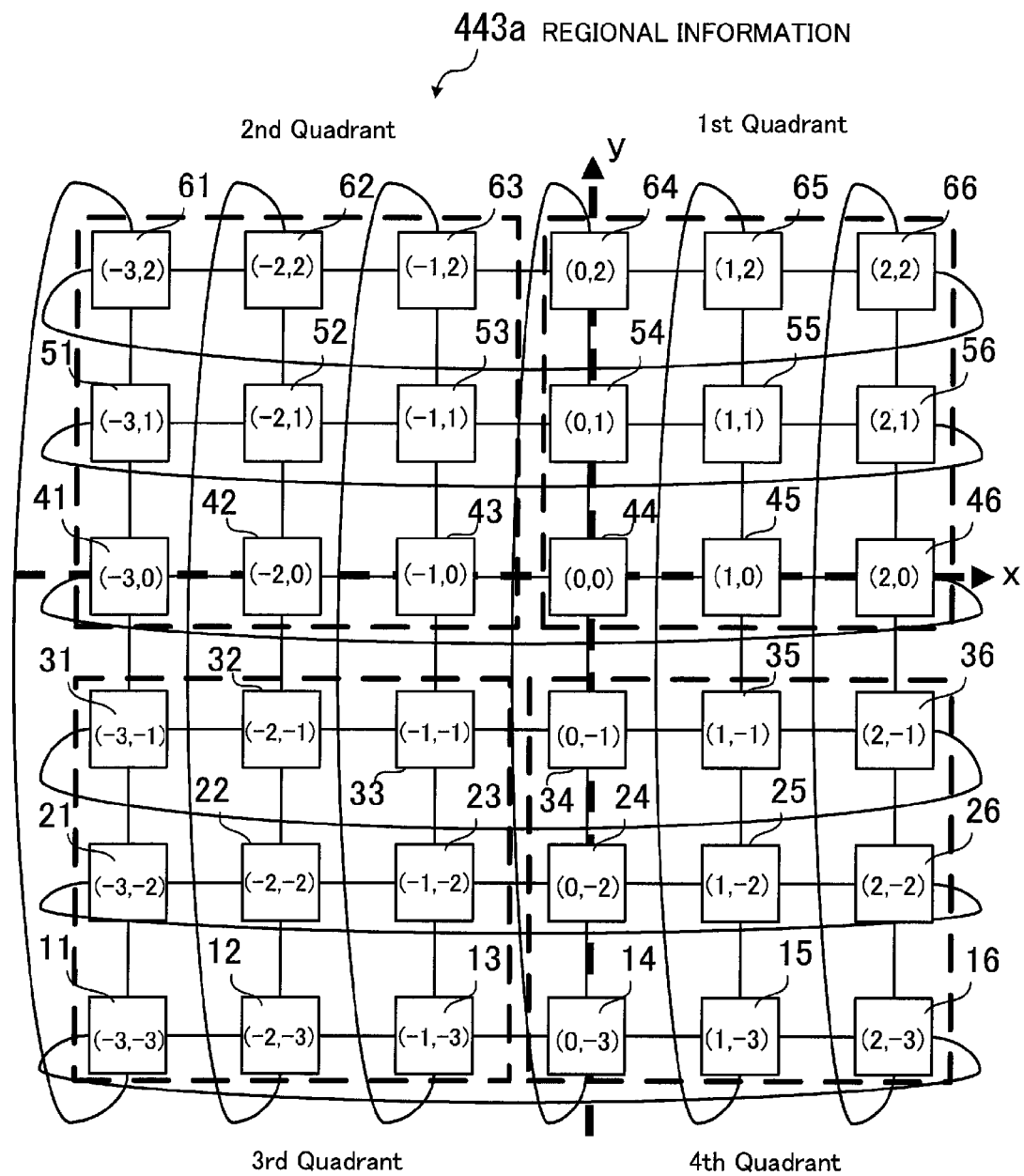
FIG. 7 illustrates an example of regional information.

The region determination unit 441 determines the region to which each node belongs, on the basis of the system-configurational information 442a. Then, the region management table is produced by assigning the relative coordinates (with respect to the source node 44) to the respective nodes. In the following explanations, it is assumed that the two-dimensional plane in which the nodes of the torus network 10 are arranged are split into four regions by boundary lines extending to four directions from the node 44. FIG. 7 illustrates an example 443a of the regional information. The regional information 443a is constituted by information indicating the region to which each node belongs and the relative coordinates of each node with respect to the source node. In the example of FIG. 7, the source node is the node 44, and the two-dimensional surface of the 6×6 torus network 10 is spit into four quadrants on the basis of whether or not each relative coordinate with respect to the source node 44 is below zero. Therefore, in the example of FIG. 7, the nodes the x-coordinates of which are zero belong to the first or fourth quadrant, and the nodes the y-coordinates of which are zero belong to the first or second quadrant. However, the manner of determining which region each node located on the x- or y-axis (having the x- or y-coordinate equal to zero) belongs to is determined on the basis of the absolute coordinates of the source node, as explained in detail later.

The relative coordinates of each node with respect to the source node 44 are obtained by subtracting the absolute coordinates of the node 44 from the absolute coordinates of each node. The nodes having a positive relative x-coordinate and a positive relative y-coordinate belong to the first quadrant, the nodes having a negative relative x-coordinate and a positive relative y-coordinate belong to the second quadrant, the nodes having a negative relative x-coordinate and a negative relative y-coordinate belong to the third quadrant, and the nodes having a positive relative x-coordinate and a negative relative y-coordinate belong to the fourth quadrant.

The order determination unit 444 determines the order of submission to the nodes (i.e., the priorities of the message submissions to the nodes) in each region (e.g., in each quadrant in this example) on the basis of the regional information 443*a*. In each sequence of collective communication of unique-messages, the source node located at the origin of the relative coordinate system performs message submission to an identical number of destination nodes in each region per submission cycle. At this time, the first to fourth quadrants to which the destination nodes belong may be cyclically scanned in each submission cycle. It is possible to consider various rules for determining the order of submission to the nodes in each region (i.e., the order of scanning the nodes in each region). For example, the submission to the nodes may be performed in ascending or descending order of the number of hops, or in an interleaving manner. Hereinbelow, the rule for determining the order of submission to the nodes in each region is explained in detail.

Figure 8:
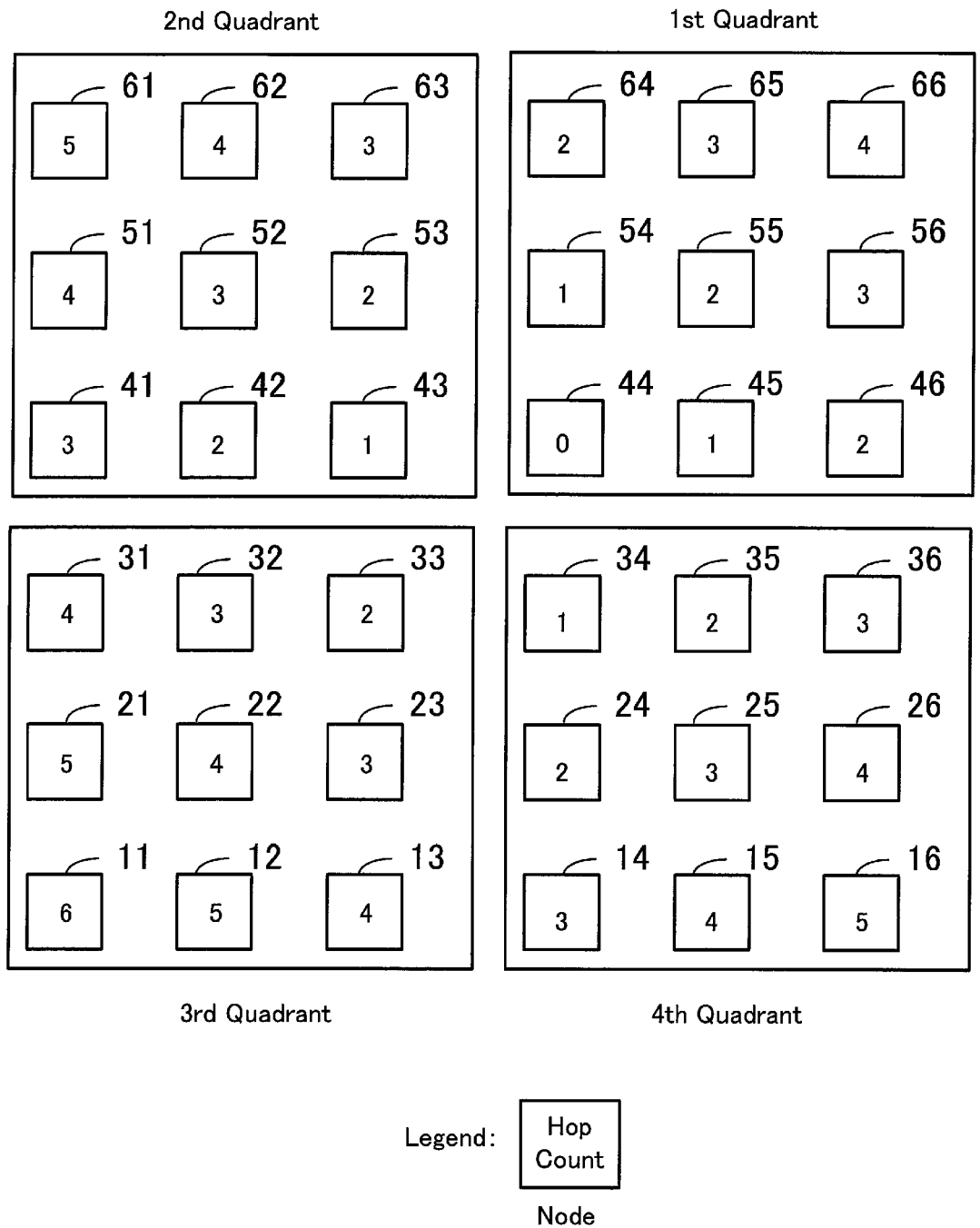
FIG. 8 illustrates examples of the numbers of hops to respective nodes.

FIG. 8 illustrates examples of the numbers of hops to respective nodes. As illustrated in FIG. 8, the number of hops increases with the distance from the source to the destination. Therefore, it is possible to set the priorities of the message submissions to the destination nodes in ascending order of the number of hops. However, in the case where the numbers of hops in routes to more than one node are identical, a rule is preferable for determining the order of submission. In the present embodiment, a higher priority is given to message submission to a node having a greater x-coordinate value in the first quadrant.

Figure 9:
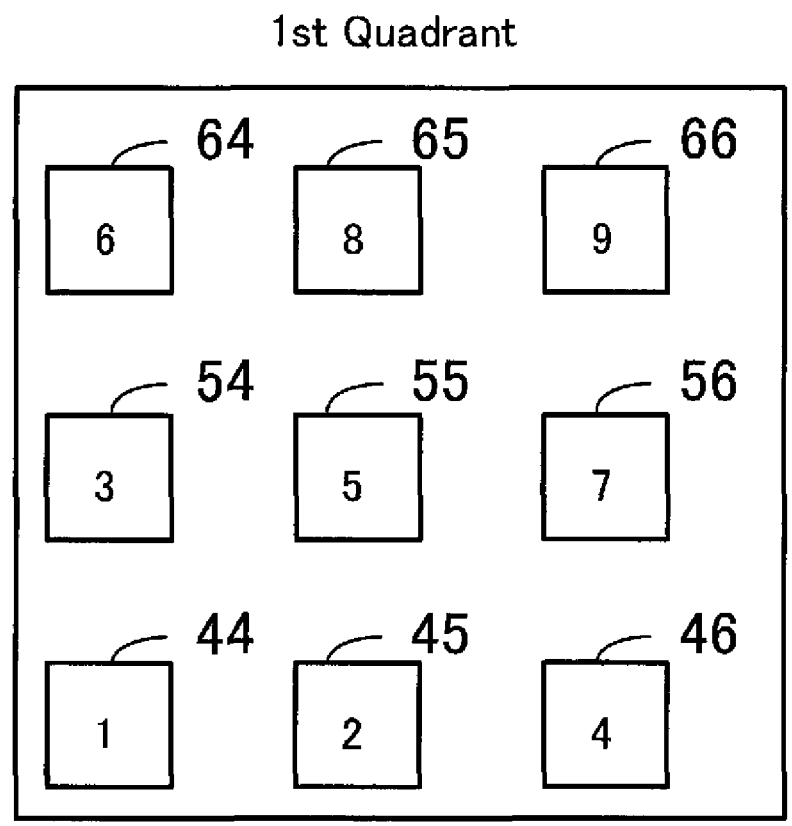
FIG. 9 illustrates an example of the order of submission to nodes in the first quadrant.
Figure 9:
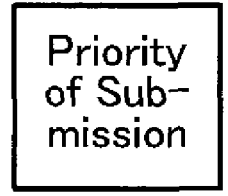

FIG. 9 illustrates an example of the order of submission in the first quadrant. (In the example of FIG. 9, the priority of the message submission to the source node 44 is set to "1" for convenience in determination of the order of submission to the other (the second, third, and fourth) quadrants, although the node 44 does not become a destination in the sequence of the collective communication of unique-messages. Although some data may be supplied to the job process 447 in the node 44 during the collective communication of unique-messages, such an operation is performed as an internal operation in the node 44.) In FIG. 9, although the numbers of hops in the routes to the nodes 45 and 54 are an identical value "1," the node 45 has a greater x-coordinate value than the node 54. Therefore, the priorities of the message submissions to the nodes 45 and 54 are respectively set to "2" and "3."

The orders of submission to the nodes in the second and fourth quadrants are determined by symmetric transformation (flipping) of the order of submission to the nodes in the first quadrant with respect to the y-axis and the x-axis, respectively. Then, in each the second and fourth quadrants, the order obtained by the symmetric transformation is reversed. That is, the orders of submission to the nodes in the second and fourth quadrants are descending orders of the number of hops.

In addition, the order of submission to the nodes in the third quadrant is determined as follows. That is, first, a provisional order of submission to the nodes in the second quadrant is obtained by symmetric transformation (flipping) of the order of submission to the nodes in the first quadrant with respect to the y-axis, and then the order of submission to the nodes in the third quadrant is obtained by symmetric transformation (flipping) of the provisional order of submission to the nodes in the second quadrant with respect to the x-axis. These operations are equivalent to the point-symmetric transformation of the order of submission to the nodes in the first quadrant into the fourth quadrant with respect to the origin.

Figure 10:
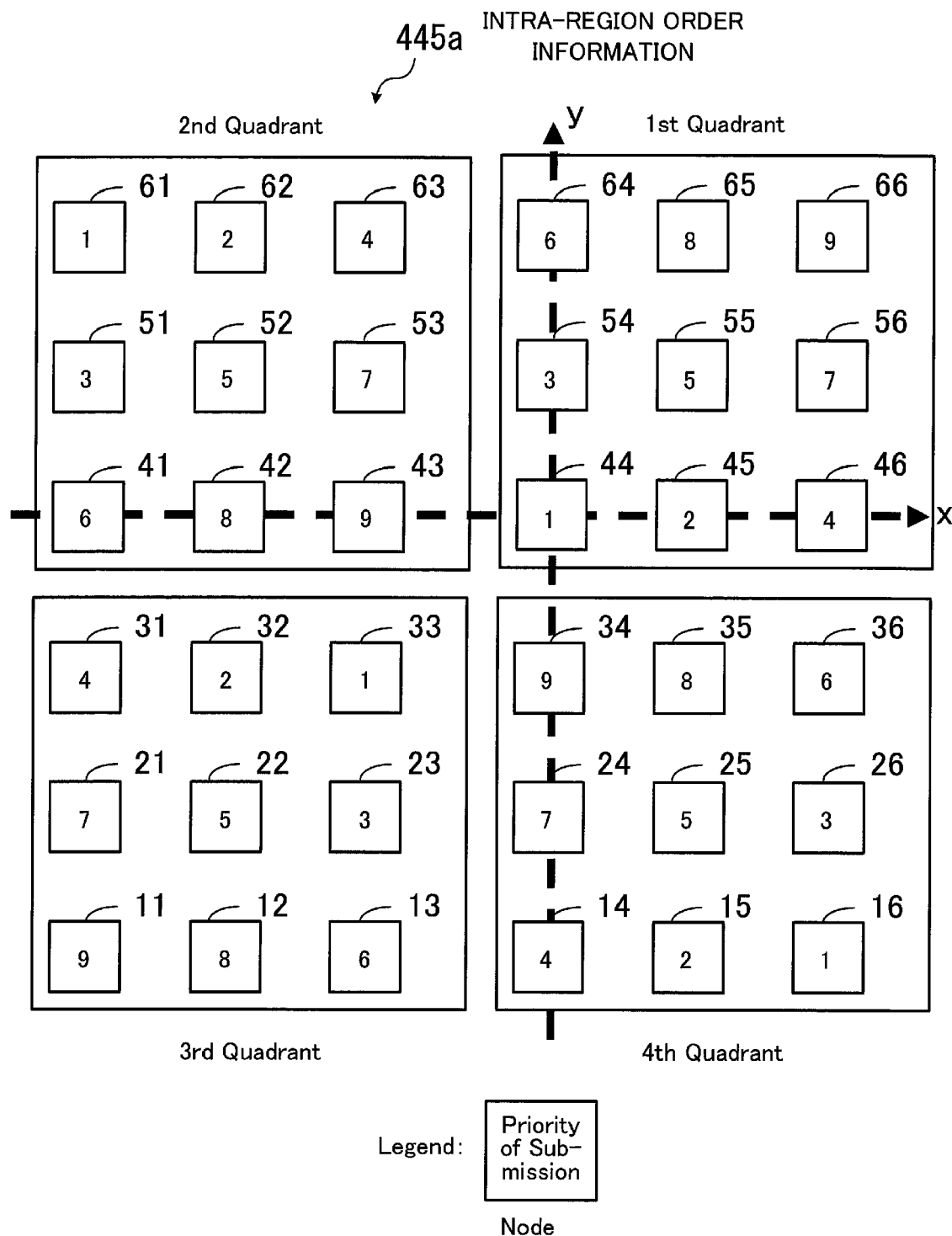
FIG. 10 illustrates an example of intra-region order information for a 6×6 torus network (an example of even nodes for each axis case)

The orders of submission to the nodes in the first to fourth quadrants obtained as above are set as the intra-region order information. FIG. 10 illustrates an example 445*a* of the intra-region order information. In FIG. 10, the priorities of the message submissions to the respective nodes in each region (quadrant) are indicated by the numbers (integers) from 1 to 9 in the blocks representing the nodes and being two-dimensionally placed in a similar arrangement to the nodes in the torus network 10, where the smaller numbers indicate higher priorities. However, information preferable for collective communication of unique-messages is only the absolute coordinates of each node and the priority of the message submission to each node. It is sufficient that the intra-region order information 445*a* include at least the priority of the message submission to each node in correspondence with the absolute coordinates of the node. When a sequence of collective communication of unique-messages is started, in each submission cycle, one-to-one transmission to a node having a priority corresponding to the ordinal number of the current submission cycle in each region is performed by reference to the intra-region order information 445*a*.

The collective communication of unique-messages is performed in the order defined as explained above. That is, submission to a node in every quadrant is performed in each submission cycle except that submission to no node in the first quadrant is performed in the first submission cycle. Thus, the traffic occurring in the quadrants are spatially balanced in each submission cycle.

FIG. 11 illustrates an example of load balancing in communications performed on the basis of the intra-region order information of FIG. 10. In FIG. 11, the hop count (the number of hops) in each hop direction in each quadrant in each submission cycle, the subtotal of the hop counts in each hop direction in each submission cycle, and the total hop count in each submission cycle are tabulated. In the table of FIG. 11, the column for each submission cycle is identified by the submission cycle number counted from the beginning of the collective communication of unique-messages, and includes the four subcolumns for the four hop directions x+, x−, y+, and y−, where x+ indicates the direction of increasing the x-coordinate, x− indicates the direction of decreasing the x-coordinate, y+ indicates the direction of increasing the y-coordinate, and y− indicates the direction of decreasing the y-coordinate.

The number of hops (hop count) in each hop direction in submission of a message to a node in the first quadrant in each submission cycle is indicated in the row for the first quadrant, the number of hops (hop count) in each hop direction in submission of a message to a node in the second quadrant in each submission cycle is indicated in the row for the second quadrant, the number of hops (hop count) in each hop direction in submission of a message to a node in the third quadrant in each submission cycle is indicated in the row for the third quadrant, and the number of hops (hop count) in each hop direction in submission of a message to a node in the fourth quadrant in each submission cycle is indicated in the row for the fourth quadrant. In addition, the subtotal of the hop counts in all the quadrants is indicated for each hop direction in each submission cycle, and the total of the hop counts in all the hop directions in all the quadrants is indicated for each submission cycle.

In the example of FIG. 11, the total of the hop counts in all the hop directions in all the quadrants is 12 in every submission cycle. That is, the equal communication loads corresponding to 12 hops occur in every submission cycle. Therefore, the communication loads are balanced along the time axis.

In the example of FIG. 11, the subtotals of the hop counts in the hop directions x+ and y+ in every submission cycle are two, and the subtotals of the hop counts in the hop directions x− and y− in every submission cycle are four. The difference in the subtotals of the hop counts between the hop directions x− and y− and the hop directions x− and y− is caused by the definition of the quadrants that the nodes the x-coordinates of which are zero belong to the first or fourth quadrant, and the nodes the y-coordinates of which are zero belong to the first or second quadrant. For example, one more hop in the hop direction x− is needed in the second quadrant than in the first quadrant, one more hop in the hop direction y− is needed in the fourth quadrant than in the first quadrant, and one more hop in the hop direction x− and one more hop in the hop direction y− are needed in the third quadrant than in the first quadrant. Therefore, in total, the subtotals in the hop direction x− becomes two greater than the subtotals in the hop direction x+, and the subtotals in the hop direction y− becomes two greater than the subtotals in the hop direction y+. In other words, the additional hop counts in the hop directions x− and y− correspond to the hops across the boundaries between the regions (i.e., the x- and the y-axes). Therefore, the additional hop counts in the hop directions x− and y− are two regardless of the size of the torus network in the case where the entire area of the torus network is split into four quadrants.

When the additional hop counts in the hop directions x− and y− are disregarded, the subtotals of the hop counts in every hop direction becomes two. That is, the load balancing is achieved. The uniformness of the hop counts is not lost even when the number of nodes in the torus network increases. Therefore, in large-scale torus networks, the occurrence of the additional hop counts in the hop directions x− and y− does not substantially affect the load balancing, and the uniformness of the hop directions is maintained in each submission cycle.

Next, details of determination of a region to which a node located on the x-axis belongs (i.e., a node the relative y-coordinate of which is zero) or a region to which a node located on the y-axis belongs (i.e., a node the relative x-coordinate of which is zero) are explained below.

In the case where the number of nodes arranged in the direction along each of the x-axis and the y-axis in the torus network is even, and the entire area of the torus network is split by use of the x-axis and the y-axis, additional hops in some hop directions become preferable according to the arrangement of the boundary lines. Therefore, in the case where the order of submission to nodes (i.e., the order of scanning of nodes as destinations) is determined as explained before, two additional hop counts in the hop directions x− and y− occur. Although the occurrence of the additional hop counts in part of hop directions does not substantially affect the one-to-all type collective communication of unique-messages such as the scatter communication, the occurrence of the additional hop counts in part of hop directions may not be ignorable in some cases where all-to-all type collective communication of unique-messages is performed.

In the all-to-all type collective communication of unique-messages, it is possible to prevent imbalance in the hop counts to any hop direction by determining the quadrant to which nodes having a relative coordinate value equal to zero are regarded as belonging, on the basis of whether the absolute coordinate value of each source node corresponding to the relative coordinate value is odd or even. For example, the nodes having relative x-coordinates equal to zero are regarded as belonging to the second or third quadrant when the absolute x-coordinate value of a source node is an even number, the nodes having relative x-coordinates equal to zero are regarded as belonging to the first or fourth quadrant when the absolute x-coordinate value of a source node is an odd number, the nodes having relative y-coordinates equal to zero are regarded as belonging to the third or fourth quadrant when the absolute y-coordinate value of a source node is an even number, and the nodes having relative y-coordinates equal to zero are regarded as belonging to the first or second quadrant when the absolute y-coordinate value of a source node is an odd number.

In the case where the regions to which the respective nodes in the torus network of FIG. 6 belong are determined in the manner explained above, when the node 44 is the source node, the node 44 belongs to the first quadrant. When the source node belongs to the first quadrant, two additional hop counts in the hop directions x− and y− occur. When the node 43 is the source node, the node 43 belongs to the second quadrant. When the source node belongs to the second quadrant, two additional hop counts in the hop directions x+ and y− occur. When the node 33 is the source node, the node 33 belongs to the third quadrant. When the source node belongs to the third quadrant, two additional hop counts in the hop directions x+ and y+ occur. When the node 34 is the source node, the node 34 belongs to the fourth quadrant. When the source node belongs to the fourth quadrant, two additional hop counts in the hop directions x− and y+ occur. Since all the nodes become the source node in the all-to-all communication, the additional hop counts in all the hop directions are balanced.

Although the determination of the split into the regions and the order of submission to the nodes are explained by taking an example of the 6×6 two-dimensional torus network 10 illustrated in FIG. 6, the explained technique can be applied to all the two-dimensional torus networks in which nodes are arranged in an even number of rows and an even number of columns. However, the technique explained with reference to FIG. 6 cannot be directly applied to the two-dimensional torus networks in which nodes are arranged in an odd number of rows and an odd number of columns. Next, a technique for determining the split into regions and the order of submission to nodes in a two-dimensional torus network in which nodes are arranged in an odd number of rows and an odd number of columns are explained below.

Figure 12:
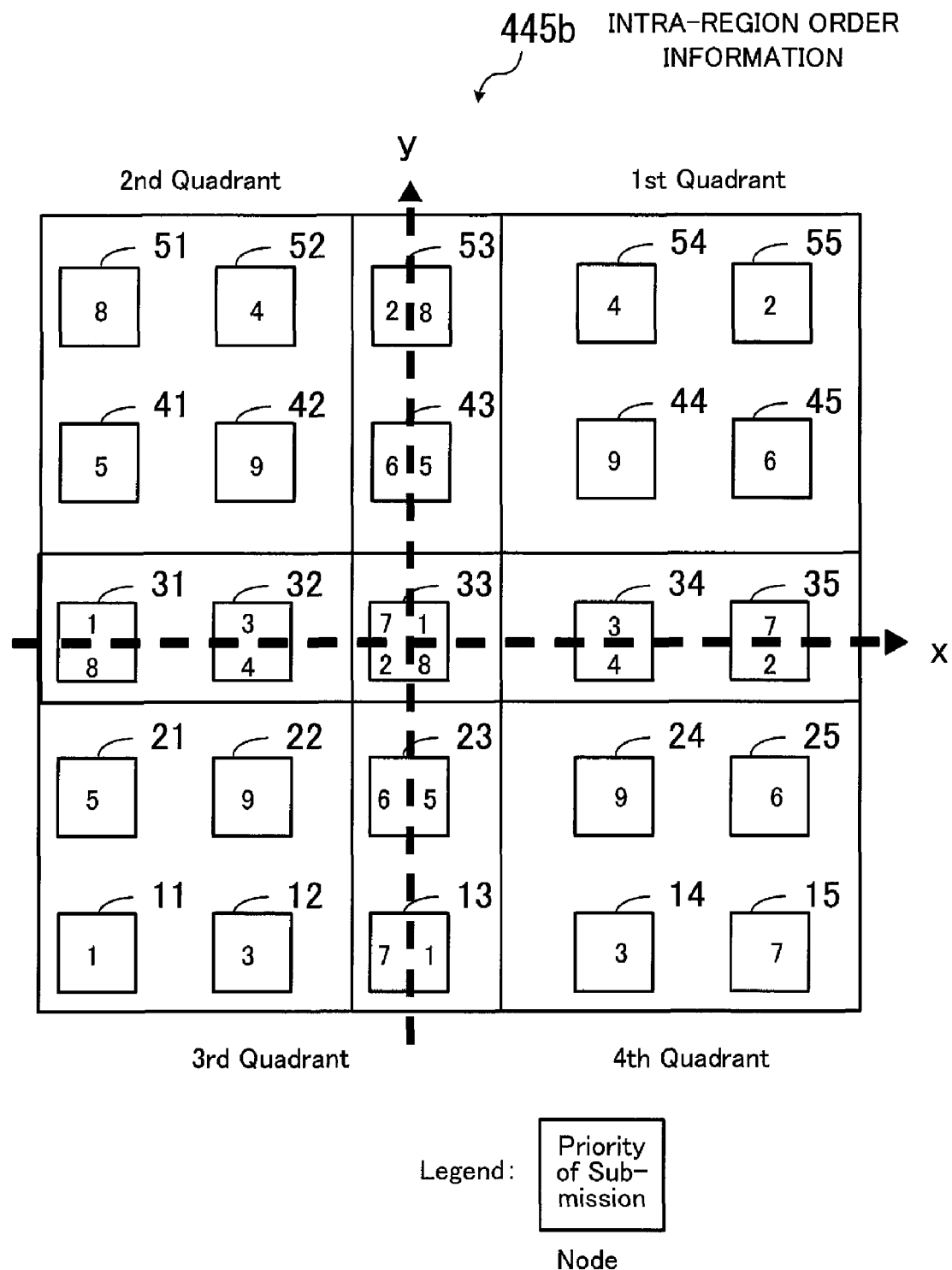
FIG. 12 illustrates examples of intra-region order information for a 5×5 torus network (an example of odd nodes for each axis case)

FIG. 12 illustrates examples of intra-region order information for a 5×5 torus network. The 5×5 torus network of FIG. 12 is an example of the two-dimensional torus network in which nodes are arranged in an odd number of rows and an odd number of columns. In the example of FIG. 12, the 5×5 two-dimensional torus network is split into four quadrants according to the signs of relative x- and y-coordinates. According to the technique explained below, the nodes with a zero coordinate are regarded as having both positive and negative coordinates. For example, each of the nodes 43 and 53, which have a zero x-coordinate and a positive y-coordinate, is regarded as belonging to both the first and second quadrants; each of the nodes 13 and 23, which have a zero x-coordinate and a negative y-coordinate, is regarded as belonging to both the third and fourth quadrants; each of the nodes 34 and 35, which have a positive x-coordinate and a zero y-coordinate, is regarded as belonging to both the first and fourth quadrants; and each of the nodes 31 and 32, which have a negative x-coordinate and a zero y-coordinate, is regarded as belonging to both the second and third quadrants. In addition, the node 33 (i.e., the source node), of which both of the x- and y-coordinates are zero, is regarded as belonging to all of the first to fourth quadrants.

After the regions (quadrants) to which the respective nodes belong are determined as above, the order of submission to the nodes belonging to each region (quadrant) is determined. According to the rule (for scanning the nodes as destinations) explained below, the order of submission to the nodes in the first quadrant is determined as follows.

First, a provisional order of submission to the nodes in the first quadrant is determined on the basis of the hop counts in the first quadrant in a similar manner to the determination of the order explained with reference to FIG. 9, where nodes having greater x-coordinate values have higher priorities in the provisional order. At this time, the provisional priorities 1, 2, . . . m of the message submissions to the nodes in each region are determined, where m is the number of nodes in each region (and is an integer equal to or greater than one). Thereafter, the actually used (final) order of submission to the nodes is determined by use of the provisional order in a kind of interleaving manner. Specifically, the actually used order of submission to the nodes is determined as P1, Pm, P2, Pm-1 . . . , where Pi is message submission to the node having the provisional priority an integer "i" ($1 \leq i \leq m$). That is, for example, the message submission to the node 33 having the provisional priority "1" is determined to have final priority "1," the message submission to the node 55 having the provisional priority "9 (=m)" is determined to have final priority "2," the message submission to the node 34 having the provisional priority "2" is determined to have final priority "3," and the message submission to the node 54 having the provisional priority "8 (=m−1)" is determined to have final priority "4." Thus, the actually used (final) order of submission to the nodes in the first quadrant is obtained as indicated in the blocks in the first quadrant in FIG. 12.

Subsequently, the actually used (final) order of submission to the nodes in each of the other quadrants is determined by the parallel movement (shifting) of the final priorities of the message submissions to the nodes in the first quadrant, as indicated in the blocks in the second to fourth quadrants in FIG. 12.

When the actually used order of submission to the nodes in each quadrant is determined as above, an opportunity of message submission to each node belonging to multiple quadrants is given for each of the multiple quadrants during a sequence of collective communication of unique-messages. Therefore, multiple opportunities of message submission to each node belonging to multiple quadrants are given in correspondence with the multiple quadrants during a sequence of collective communication of unique-messages. In order to cope with this problem, for example, submission data to be submitted to each node belonging to multiple quadrants is divided into multiple portions respectively corresponding to the multiple opportunities of message submission to the node, and each of the divided portions is inserted in a message and submitted to the node in one of the multiple opportunities. Specifically, data to be submitted to each node located on one or more (n; an integer, greater or equal to 0) coordinate axes is divided into 2n portions (where n is the number of the one or more coordinate axes), and each portion is submitted to the node by one-to-one communication in one of the 2n opportunities of message submission to the node corresponding to the 2n quadrants divided by the n coordinate axes. At this time, the hop count in the message submission corresponding to each quadrant is reduced to ½n. In the example of FIG. 12, each of the nodes 13, 23, 31, 32, 34, 35, 43, and 53 has x- and y-coordinates one of which is zero, and is therefore located on a coordinate axis. That is, n=1. Thus, data to be submitted to each of the nodes 13, 23, 31, 32, 34, 35, 43, and 53 is divided into two portions, and each of the divided portions is inserted in a message and submitted to the node. Although the node 33 has x- and y-coordinates both of which are zero and is therefore is located on both of the x-axis and y-axis (n=2 case), the node 33 is the source node, so that the node 33 is not a destination.

FIG. 13 illustrates an example of load balancing in communications performed on the basis of the intra-region order information indicated in FIG. 12. In FIG. 13, the hop count (the number of hops) in each hop direction in each quadrant in each submission cycle, the subtotal of the hop counts in each hop direction in each submission cycle, and the total hop count in each submission cycle are tabulated in a similar manner to FIG. 11, where the hop count in submission to each node located on a coordinate axis is reduced as mentioned before. In the example of FIG. 13, the total hop count in each submission cycle is in the range of 6 to 8. That is, the communication loads are approximately balanced.

Although the subtotal of the hop counts in each hop direction in each submission cycle is different from the subtotals in the adjacent submission cycle in the example of FIG. 13, the average of the subtotals of the hop counts in each hop direction in each of almost all of the pairs of adjacent submission cycles is 1.5 or 2.0. In other words, the sum of the subtotals of the hop counts in each hop direction in each of almost all of the pairs of adjacent submission cycles is 3.0 or 4.0, and the variations in the sum of the subtotals of the hop counts in each hop direction in each of almost all of the pairs of adjacent submission cycles are at most approximately 1.0. This is because the actually used order of submission to the nodes in each quadrant is not the simple ascending or descending order, and is (a kind of) interleaved as explained before. That is, the hop counts are not imbalanced in a specific direction. Thus, the communication loads are approximately balanced.

Further, generally, in the torus network, nodes may be arranged in an even number of rows and an odd number of columns, or in an odd number of rows and an even number of columns. That is, the number of nodes arranged along each axis of the torus network may be different, and may be even or odd. In such cases, in order to determine the region to which each node belongs, the technique explained with reference to FIGS. 12 and 13 can be used for division in each direction in which an odd number of nodes are arranged in the torus network, and the technique explained with reference to FIGS. 6 to 11 can be used for division in each direction in which an even number of nodes are arranged in the torus network.

Processing Sequence

Figure 14:
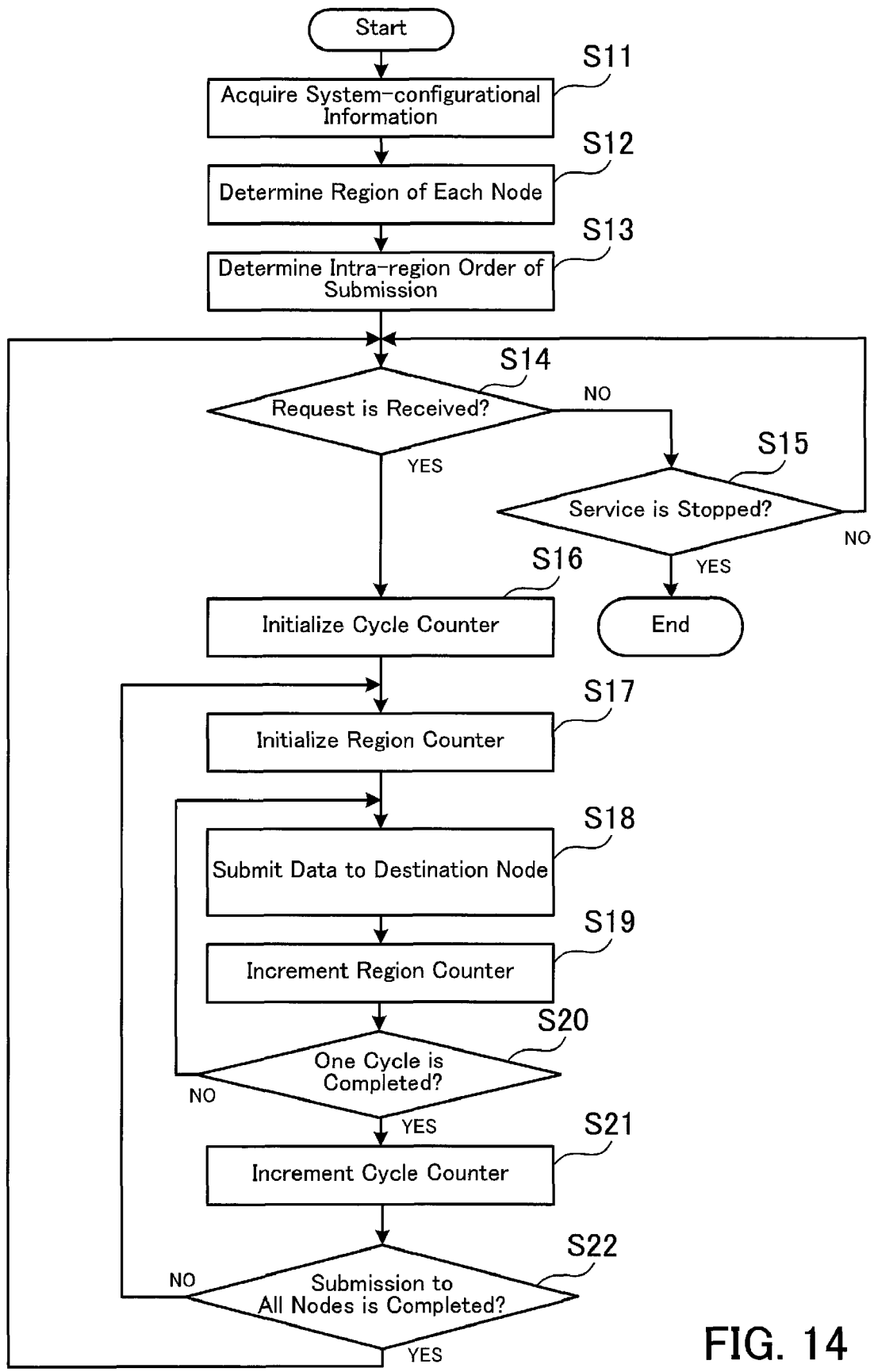
FIG. 14 is a flow diagram indicating a sequence of processing for collective communication of unique-messages according to the first embodiment.

Hereinbelow, a sequence of processing for collective communication of unique-messages performed by the node 44 in the torus network 10 is explained step by step with reference to FIG. 14, which is a flow diagram indicating the sequence of processing for collective communication of unique-messages according to the first embodiment. The following processing is started when the node 44 is started up and receives, as a node in the torus network, an instruction to start a data processing service. The instruction may be automatically issued by the OS, or inputted by the system operations administrator through the management server 70.

<Step S11> The region determination unit 441 acquires the system-configurational information from the management server 70, and stores the acquired system-configurational information in the configurational-information storage 442.

<Step S12> The region determination unit 441 divides the coordinate space of the torus network 10 into a predetermined number of regions, and determines a region to which each node belongs. Specifically, the region determination unit 441 recognizes the absolute coordinates of the node 44 on the basis of the system-configurational information, and obtains the relative coordinates of all the other nodes with respect to the position of the node 44 as the source node.

Subsequently, the region determination unit 441 divides the two-dimensional relative coordinate space into four quadrants. The x-coordinates and the y-coordinates are positive in the first quadrant, the x-coordinates are negative and the y-coordinates are positive in the second quadrant, the x-coordinates and the y-coordinates are negative in the third quadrant, and the x-coordinates are positive and the y-coordinates are negative in the fourth quadrant. At this time, the region determination unit 441 determines whether the number of nodes arranged in the x-axis direction and the number of nodes arranged in the y-axis direction are both even, both odd, or odd and even.

In the case where the torus network 10 is determined to be a torus network in which an even number of nodes are arranged in both of the x-axis and y-axis directions, the region determination unit 441 determines a manner of determination of the region to which each node having a relative x- or y-coordinate which is equal to zero. When the absolute x-coordinate of the node 44 is an even number, the nodes each having a relative x-coordinate equal to zero are regarded as belonging to the second or third quadrant. When the absolute x-coordinate of the node 44 is an odd number, the nodes each having a relative x-coordinate equal to zero are regarded as belonging to the first or fourth quadrant. When the absolute y-coordinate of the node 44 is an even number, the nodes each having a relative y-coordinate equal to zero are regarded as belonging to the third or fourth quadrant. When the absolute y-coordinate of the node 44 is an odd number, the nodes each having a relative y-coordinate equal to zero are regarded as belonging to the first or second quadrant.

In the case where the torus network 10 has the configuration as illustrated in FIG. 6, the absolute coordinates of the node 44 are (3, 3). That is, the absolute x-coordinate and the absolute y-coordinate are odd numbers. Therefore, the nodes each having a relative x-coordinate equal to zero belong to the first or fourth quadrant, and the nodes each having a relative y-coordinate equal to zero belong to the first or second quadrant. That is, the regional information 443a as illustrated in FIG. 7 is produced.

In the case where the torus network has a configuration in which an odd number of nodes are arranged in each of the x-axis direction and the y-axis direction, the nodes located on the x-axis and/or the y-axis are each regarded as belonging to regions (quadrants) on both sides of the x-axis and/or the y-axis.

In the case where the torus network has a configuration in which an odd number of nodes are arranged in the x-axis direction and an even number of nodes are arranged in the y-axis direction, the nodes located on the y-axis (having a zero relative x-coordinate) are each regarded as belonging to regions (quadrants) on both sides of the y-axis, and the region to which each node located on the x-axis (having a zero relative y-coordinate) belongs is determined on the basis of the absolute y-coordinate of the source node 44. When the absolute y-coordinate of the source node 44 is an even number, each node located on the x-axis (having a zero relative y-coordinate) is regarded as belonging to the third or fourth quadrant. When the absolute y-coordinate of the source node 44 is an odd number, each node located on the x-axis (having a zero relative y-coordinate) is regarded as belonging to the first or second quadrant.

In the case where the torus network has a configuration in which an even number of nodes are arranged in the x-axis direction and an odd number of nodes are arranged in the y-axis direction, the nodes located on the x-axis (having a zero relative y-coordinate) are each regarded as belonging to regions (quadrants) on both sides of the x-axis, and the region to which each node located on the y-axis (having a zero relative x-coordinate) belongs is determined on the basis of the absolute x-coordinate of the source node 44. When the absolute x-coordinate of the source node 44 is an even number, each node located on the y-axis (having a zero relative x-coordinate) is regarded as belonging to the second or third quadrant. When the absolute x-coordinate of the source node 44 is an odd number, each node located on the y-axis (having a zero relative x-coordinate) is regarded as belonging to the first or fourth quadrant.

The region determination unit 441 produces the regional information indicating the region to which each node belongs, and stores the regional information in the regional-information storage 443.

<Step S13> The order determination unit 444 determines the order of submission to the nodes in each region. Specifically, the order determination unit 444 refers to the regional information, which is stored in the regional-information storage 443. Then, the order determination unit 444 acquires the information on the nodes in the first quadrant, and determines the priorities of the message submissions to the nodes in the first quadrant in ascending order of the number of hops from the source node 44 to the destination. At this time, when the numbers of hops in the routes from the source node 44 to two nodes are identical, submission to the node having a greater x-coordinate value precedes submission to the other node.

The order determination unit 444 determines whether the number of nodes arranged in the x-axis direction and the number of nodes arranged in the y-axis direction are both even, both odd, or odd and even. In the case where the torus network has a configuration in which an even number of nodes are arranged in each of the x-axis direction and the y-axis direction, first, the order determination unit 444 determines provisional order of submission to the nodes in the second quadrant by assigning provisional priorities to the message submissions to the nodes in the second quadrant. At this time, the provisional priorities to the message submissions to the nodes in the second quadrant are assigned by line-symmetry transformation, with respect to the y-axis, of the priorities of the message submissions to the nodes in the first quadrant. Then, the order determination unit 444 determines the actually used (final) priorities of the message submissions to the nodes in the second quadrant by reversing the provisional order of the submission to the nodes in the second quadrant. Second, the order determination unit 444 determines actually used (final) priorities of the message submissions to the nodes in the third quadrant by point-symmetry transformation, with respect to the origin, of the priorities of the message submissions to the nodes in the first quadrant. Third, the order determination unit 444 obtains provisional order of submission to the nodes in the fourth quadrant by assigning provisional priorities to the message submissions to the nodes in the fourth quadrant. At this time, the provisional priorities to the message submissions to the nodes in the fourth quadrant are assigned by line-symmetry transformation, with respect to the x-axis, of the priorities of the message submissions to the nodes in the first quadrant. Then, the order determination unit 444 determines the actually used (final) priorities of the message submissions to the nodes in the fourth quadrant by reversing the provisional order of submission to the nodes in the fourth quadrant.

In the case where the torus network has a configuration in which an odd number of nodes are arranged in each of the x-axis direction and the y-axis direction, first, the order determination unit 444 determines provisional order of submission to the nodes in the second quadrant by assigning provisional priorities to the message submissions to the nodes in the second quadrant. At this time, the provisional priorities to the message submissions to the nodes in the second quadrant are assigned by translation (parallel movement) of the priorities of the message submissions to the nodes in the first quadrant. Then, the order determination unit 444 determines the actually used (final) priorities of the message submissions to the nodes in the second quadrant in a kind of interleaving manner by changing the provisional order of submission to the nodes in the second quadrant as P1, Pm, P2, Pm−1, . . . , where Pi is message submission to the node having the provisional priority an integer "i" ($1 \leq i \leq m$). Next, the order determination unit 444 determines actually used (final) priorities of the message submissions to the nodes in the third quadrant by translation (parallel movement) of the priorities of the message submissions to the nodes in the first quadrant. Further, the order determination unit 444 determines provisional order of submission to the nodes in the fourth quadrant by assigning provisional priorities to the message submissions to the nodes in the fourth quadrant. At this time, the provisional priorities to the message submissions to the nodes in the fourth quadrant are assigned by translation (parallel movement) of the priorities of the message submissions to the nodes in the first quadrant. Then, the order determination unit 444 determines the actually used (final) priorities of the message submissions to the nodes in the fourth quadrant in a kind of interleaving manner by changing the provisional order of submission to the nodes in the fourth quadrant.

In the case where the torus network has a configuration in which an even number of nodes are arranged in one of the x-axis direction and the y-axis direction, and an odd number of nodes are arranged in the other of the x-axis direction and the y-axis direction, the order of submission to the nodes is determined in a similar manner to the case where the torus network has a configuration in which an odd number of nodes are arranged in each of the x-axis direction and the y-axis direction.

The order determination unit 444 produces intra-region order information on the basis of the order of submission to the nodes in each region determined as explained above, and stores the produced intra-region order information in the order-information storage 445.

<Step S14> The communication execution unit 448 determines whether or not the job process 447 requests the communication execution unit 448 to execute collective communication of unique-messages (scatter communication or all-to-all communication). When the communication execution unit 448 receives a request for collective communication of unique-messages, the operation goes to step S16. When the communication execution unit 448 does not receive a request for collective communication of unique-messages, the operation goes to step S15.

<Step S15> The communication execution unit 448 determines whether or not an instruction to stop the service is received. The instruction to stop the service can be received, for example, through the management server 70 on the basis of a manual input by the operations administrator. When the communication execution unit 448 receives an instruction to stop the service, the communication execution unit 448 terminates the processing for collective communication of unique-messages. When the communication execution unit 448 does not receive an instruction to stop the service, the operation goes to step S14.

<Step S16> The communication execution unit 448 initializes the value of the cycle counter 448*a* to one.

<Step S17> The communication execution unit 448 initializes the value of the region counter 448*b* to one.

<Step S18> The communication execution unit 448 submits messages to the nodes in a region (quadrant) indicated by the region counter 448*b* in a submission cycle indicated by the cycle counter 448*a* in the order of submission, where each of the messages contains information unique to the destination node of the message. Specifically, the communication execution unit 448 refers to a part of the intra-region order information corresponding to the quadrant indicated by the region counter 448*b*. (For example, the values "1," "2," "3," and "4" of the region counter 448*b* respectively indicate the first, second, third, and fourth quadrants.) Then, the communication execution unit 448 determines one, corresponding to the current value of the cycle counter 448*a*, of the nodes in the quadrant currently referred to, and reads out the relative coordinates of the node, where the node corresponding to the current value of the cycle counter 448*a* is the node to which the number indicated by the cycle counter 448*a* is assigned as the priority number. The communication execution unit 448 converts the relative coordinates of the node into the absolute coordinates of the node, which are used as the destination of the message to be submitted to the node. The conversion from the relative coordinates into the absolute coordinates is realized by addition of the absolute coordinates of the source node 44 to the relative coordinates.

Thereafter, the communication execution unit 448 determines whether the number of nodes arranged in the x-axis direction and the number of nodes arranged in the y-axis direction in the torus network are both odd, or odd and even, or even and odd (i.e., the communication execution unit 448 determines whether or not the number of nodes arranged in at least one of the x-axis direction and the y-axis direction is odd). When yes is determined, each node located on a coordinate axis perpendicular to each axis direction along which an odd number of nodes are arranged belongs to more than one region. (Hereinafter, the coordinate axis perpendicular to each axis direction along which an odd number of nodes are arranged is referred to as a node-splitting axis.) Therefore, when the torus network has an axis along which an odd number of nodes are arranged, the communication execution unit 448 determines whether or not the node as the destination of the message is located on at least one node-splitting axis. When the node as the destination of the message is located on one or more node-splitting axes, the communication execution unit 448 cuts out a leading portion of the data to be submitted to the node, and inserts the leading portion in the message, where the size of the leading portion is $\frac{1}{2}n$ of the size of the entire data to be submitted to the node, and n is the number of the one or more node-splitting axes passing through the position of the node. When the node as the destination of the message is not located on one or more node-splitting axes, the communication execution unit 448 inserts in the message the entire data designated by the request.

Thereafter, the communication execution unit 448 submits the message to the destination node. At this time, the communication execution unit 448 determines a route to the destination node through which the number of hops is minimized, on the basis of the system-configurational information. When the number of hops is minimized through any of a plurality of routes, the communication execution unit 448 determines one of the plurality of routes by use of a predetermined algorithm. For example, when a route crosses a boundary between regions on the first hop, the first priority is placed on the route. When the number of hops is minimized through any of a plurality of routes, a higher priority is placed on a forwarding in the x-axis direction.

Further, a route is also determined as above by each node which relays a message.

For example, in the case where the torus network 10 is split into the regions as illustrated in FIG. 7, the minimum number of hops in the routes from the node 44 to the node 11 is six. However, whichever of the nodes 34, 43, 45, and 54 (adjacent to the node 44) the message is submitted to by the first hop, it is possible to submit the message from the node 44 to the node 11 through six hops. For example, if the message is forwarded from the node 44 to the node 11 through the nodes 54, 64, 65, 66, and 16 in this order, most of the message forwarding operations are performed within the first quadrant although the node 11 belongs to the third quadrant. In such a case, the provision for the spatial balancing of the total number of hops does not work. Therefore, when the message is submitted from the node 44 to the node 11, the message is submitted by the first hop to a node (i.e., the node 34 or 43) belonging to a different region. Since a higher priority is placed on a forwarding in the x-axis direction according to the present embodiment, the node 44 submits the message from the communication interface 44d (illustrated in FIG. 4) connected to the node 43. Then, the node 43 can recognize the destination of the message (the node 11) on the basis of the absolute coordinates of the node 11 indicated in the message. There are a plurality of routes from the node 43 to the node 11 through which the message can be submitted to the node 11 by the minimum number (five) of hops. For example, the number of hops in the route to the node 11 through the nodes 53, 63, 13, and 12 in this order is five. However, since the first priority is placed on a route which crosses a boundary between regions on the first hop according to the present embodiment, the node 43 forwards the message to the node 33. Thereafter, the message is forwarded within the third quadrant until the message reach the node 11.

<Step S19> The communication execution unit 448 increments the count of the region counter 448b by one.

<Step S20> The communication execution unit 448 determines whether or not submission of messages to all the regions in the current submission cycle is completed. Specifically, when the count of the region counter 448b exceeds the number of the regions, the communication execution unit 448 determines that submission of messages to all the regions in the current submission cycle is completed, and the operation goes to step S21. When the communication execution unit 448 determines that submission of messages to all the regions in the current submission cycle is not completed, the operation goes to step S18.

<Step S21> The communication execution unit 448 increments the count of the cycle counter 448a by one.

<Step S22> The communication execution unit 448 determines whether or not submission of messages to all the nodes is completed. Specifically, when the count of the cycle counter 448a exceeds the maximum number of the values indicating the priorities of the message submissions to the nodes, the communication execution unit 448 determines that submission of messages to all the nodes is completed, and the operation goes to step S14. When the communication execution unit 448 determines that submission of messages to all the nodes is not completed, the operation goes to step S17.

Advantages of First Embodiment

As explained above, collective communication of unique-messages can be performed in such a manner that the communication loads are balanced along the spatially and time axes. Therefore, it is possible to prevent concentration of the communication loads in some part of the transmission network. Specifically, since messages addressed to destinations in different regions are transmitted in each submission cycle, it is possible to minimize overlapping of transmission routes.

Further, according to the present embodiment, the total numbers of hops in each submission cycle are uniformized, so that it is possible to prevent transient excessive increase in the total amount of data transmitted in the torus network 10 for the collective communication of unique-messages performed by a node. For example, consider a case where a node performs scatter communication. The time taken to submit a message from a source node to a destination node increases with the number of hops performed until the message reaches the destination node. If the priority in the scatter communication is placed on completion of the submission of messages to all the nodes in the minimum time, the messages may be submitted in descending order of the number of hops (i.e., in descending order of the time taken to submit data). However, in such a case, at the timings of the submission of messages to the nearest destination nodes, many of precedingly submitted messages are still being transmitted in the torus network. When the messages submitted from a node for scatter communication forms a large proportion of the total amount of data submitted in the torus network even in a short time, the messages submitted from the node can impede data communication performed by the other nodes.

In particular, in the all-to-all communication, every node performs scatter communication. If all the nodes submit messages in descending order of the number of hops, congestion can occur at many places in the torus network when the nodes finally submit message to near destination nodes. Therefore, even the normal data communication associated with execution of the parallel job can be impeded, so that the processing efficiency of the entire system can be lowered.

As explained above, according to the first embodiment, the total numbers of hops in the submission cycles are uniformized. Therefore, the collective communication of unique-messages performed by each node does not impede data communication performed by other nodes. Even in the case of all-to-all communication, it is possible to suppress the total amount of data submitted for the all-to-all communication below a predetermined level.

Second Embodiment

The second embodiment is explained below. According to the second embodiment, the communication loads can be optimumly balanced even when the effective transmission rates of transmission lines are not uniform. The following explanations on the second embodiment are focused on only the differences from the first embodiment, and the explanations on the features of the second embodiment which are similar to the first embodiment are not repeated.

Functions of Management Server and Nodes

Figure 15:
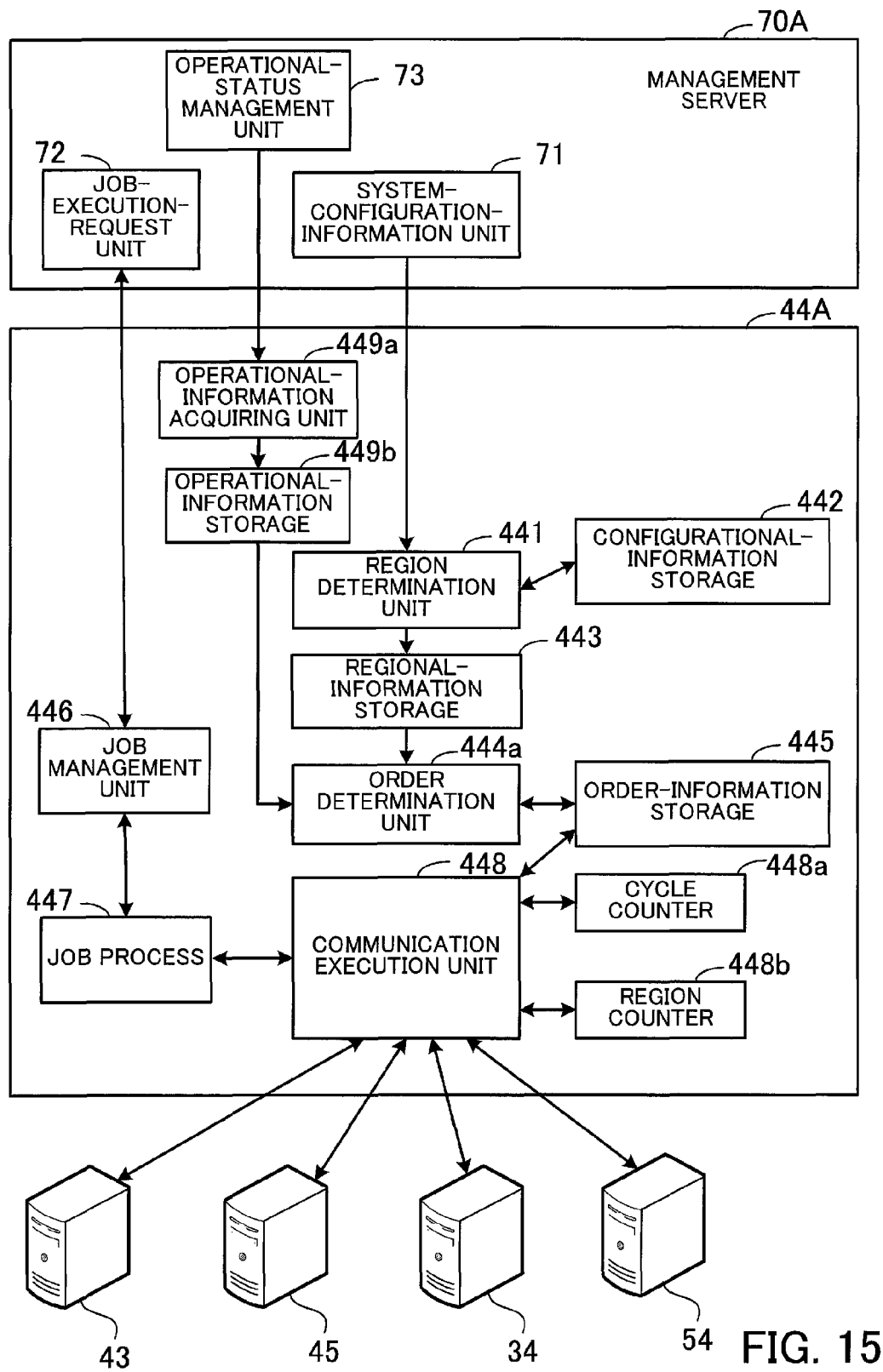
FIG. 15 is a block diagram illustrating the functions of the management server and the node according to the second embodiment.

FIG. 15 is a block diagram illustrating the functions of a management server and a node according to the second embodiment. The elements in FIG. 15 bearing the same reference numbers as the corresponding elements in FIG. 5 have similar functions to the elements in FIG. 5.

The management server 70A in the second embodiment is different from the management server 70 in the first embodiment in that the management server 70A comprises an operational-status management unit 73. The operational-status management unit 73 monitors the operational status of each node in the torus network 10 and the status of communication between each pair of adjacent nodes in the torus network 10. In addition, when each node is started up, the operational-status management unit 73 notifies each node of the effective transmission rates in the communication between each pair of adjacent nodes. Further, the operational-status management unit 73 periodically notifies each node of the effective transmission rates in communication between each pair of adjacent nodes. Furthermore, when the operational-status management unit 73 detects a node the operation of which is stopped due to failure or the like, the operational-status management unit 73 notifies each node of the absolute coordinates of the stopped node.

The node 44A in the second embodiment is different from the node 44 in the first embodiment in that the node 44A comprises an operational-information acquiring unit 449a and an operational-information storage 449b, and the order determination unit 444a in the node 44A is different from the order determination unit 444 in the first embodiment.

The operational-information acquiring unit 449a acquires operational information from the operational-status management unit 73 in the management server 70A, and stores the acquired operational information in the operational-information storage 449b. The operational information includes bandwidth information indicating the effective transmission rate in data communication between each pair of adjacent nodes and failure information indicating whether or not each node is in operation.

The operational-information storage 449b is a storage area for storing the operational information. For example, a portion of the storage area of the RAM 44b may be used as the operational-information storage 449b. The bandwidth information and the failure information in the operational information are separately stored in a bandwidth-information table and a failure-information table, respectively.

The order determination unit 444a determines the order of submission to the nodes in each region other than the node 44 as destinations (i.e., the priorities of the message submissions to the nodes), on the basis of the regional information stored in the regional-information storage 443 and the operational information stored in the operational-information storage 449b. Then, the order determination unit 444a stores the determined order of submission as the intra-region order information in the order-information storage 445.

FIG. 16 illustrates an example of a data structure in the operational-information storage. The operational-information storage 449b stores a bandwidth-information table 449c and a failure-information table 449d. The bandwidth-information table 449c has the column of the transmission line and the column of the bandwidth. The absolute coordinates of each pair of adjacent nodes on the source side and the destination side of a transmission line are indicated in the column of the transmission line, and the transmission rate in communication through each transmission line is indicated in the column of the bandwidth. The failure-information table 449d has the column of the node and the column of the status. The absolute coordinates of each node constituting the torus network are indicated in the column of the node, and information indicating whether each node is in operation, or is stopped due to failure or the like is indicated in the column of the status.

Processing Sequence

Figure 17:
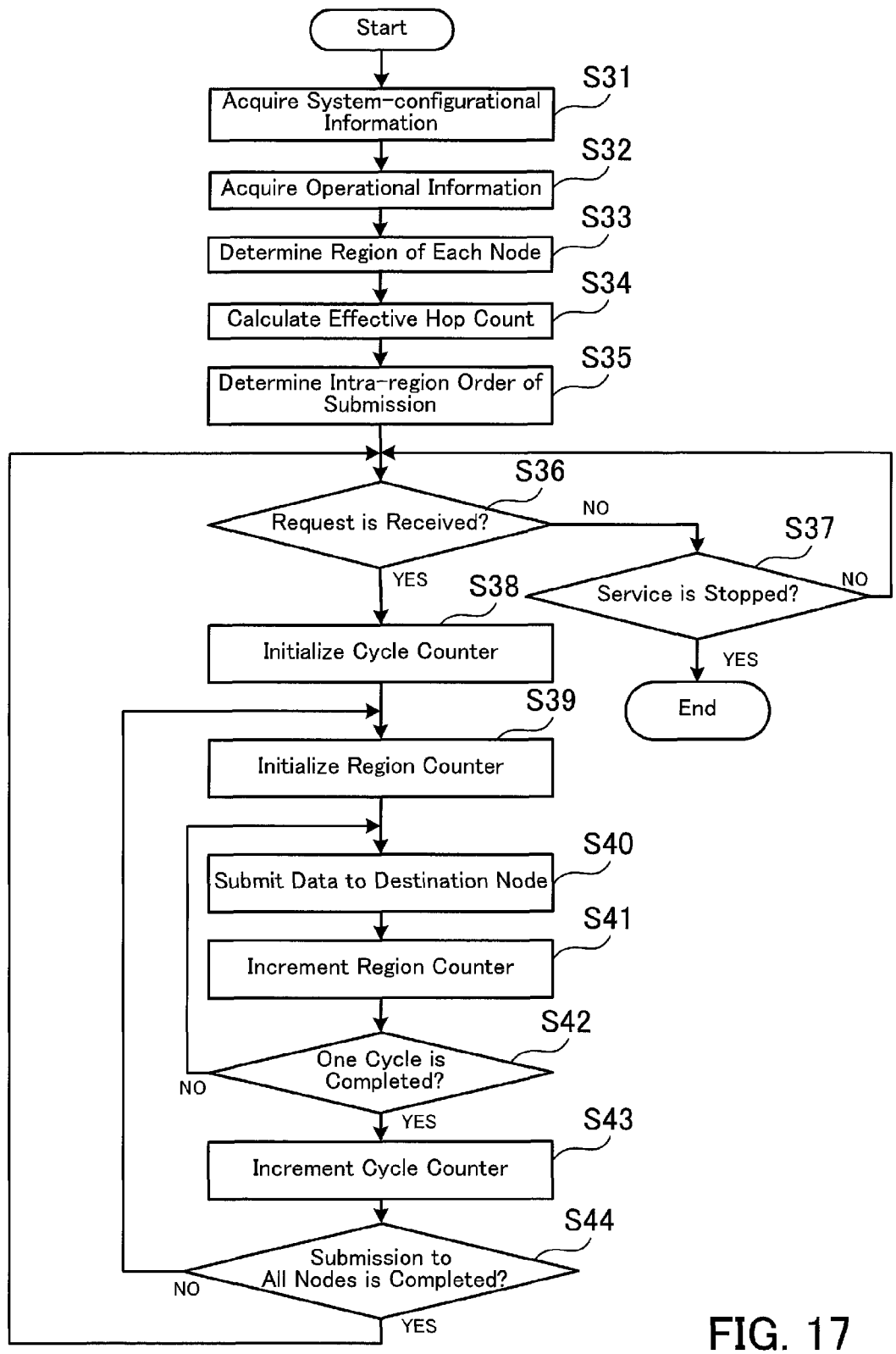
FIG. 17 is a flow diagram indicating a sequence of processing for collective communication of unique-messages according to the second embodiment.

Hereinbelow, a sequence of processing for collective communication of unique-messages performed by the node 44A is explained step by step with reference to FIG. 17, which is a flow diagram indicating the sequence of processing for collective communication of unique-messages according to the second embodiment. The following processing is started when the node 44A is started up and receives, as a node in the torus network, an instruction to start a data processing service. Since the operations in steps S31, S33, and S36 to S44 in FIG. 17 are respectively similar to the operations in steps S11, S12, and S14 to S22 in FIG. 14, only the operations in step S32, S34, and S35 are explained below.

<Step S32> The operational-information acquiring unit 449a refers to the management server 70A for the operational information, acquires the failure information and the bandwidth information from the management server 70A, and stores the acquired information in the operational-information storage 449b. When operational information is sent from the management server 70A, the operational-information acquiring unit 449a updates the contents of the operational-information storage 449b with the operational information. Thereafter, the region to which each node belongs is determined in step S33, and the operation goes to step S34.

<Step S34> The order determination unit 444a refers to the operational-information storage 449b, and calculates the effective hop count in a route from the source node 44A to each of the nodes other than the node 44A. Specifically, the order determination unit 444a refers to the operational-information storage 449b, and determines whether or not each of the nodes other than the node 44A is in operation. Then, the order determination unit 444a determines a transmission route which reaches each of the nodes in operation other than the node 44A through only one or more nodes in operation. At this time, when the destination of a message belongs to a region different from the region to which the source node 44A belongs, forwarding of the message to the region to which the destination node belongs takes precedence in the transmission route.

Next, the order determination unit 444a calculates the effective hop count in each transmission route. The effective hop count can be calculated as a sum of reciprocals of the bandwidths of the respective transmission lines which constitute the transmission route and each of which connect adjacent nodes, as indicated by the formula (1). Therefore, when the bandwidths of the transmission lines constituting the transmission route are great, the effective hop count becomes small.

<Step S35> The order determination unit 444a determines the order of submission to the nodes in each region. Specifically, the order determination unit 444a determines provisional priorities of the message submissions to the destination nodes in ascending order of the number of hops. At this time, when the number of hops in routes to a plurality of nodes are identical, submission to a node having a greater x-coordinate precedes. After the determination of the provisional priorities by the order determination unit 444a, processing similar to the processing performed after the determination of the provisional priorities by the order determination unit 444 in the first embodiment is performed.

Thereafter, in the processing in steps S36 to S44, submission to the other nodes is performed in the order based on the intra-region order information every time a request for collective communication of unique-messages is received from the job process.

As explained above, even in the case where the bandwidths (i.e., the transmission rates) of the transmission lines connecting between adjacent nodes are not equal, the communication loads can be balanced along the spatial and time axes.

Variations of Embodiments

Although the two-dimensional plane in which the nodes are arranged are split into the four quadrants by the x-axis and the y-axis in the embodiments explained above, the entire area in which nodes are arranged may be split into regions in other ways.

Figure 18:
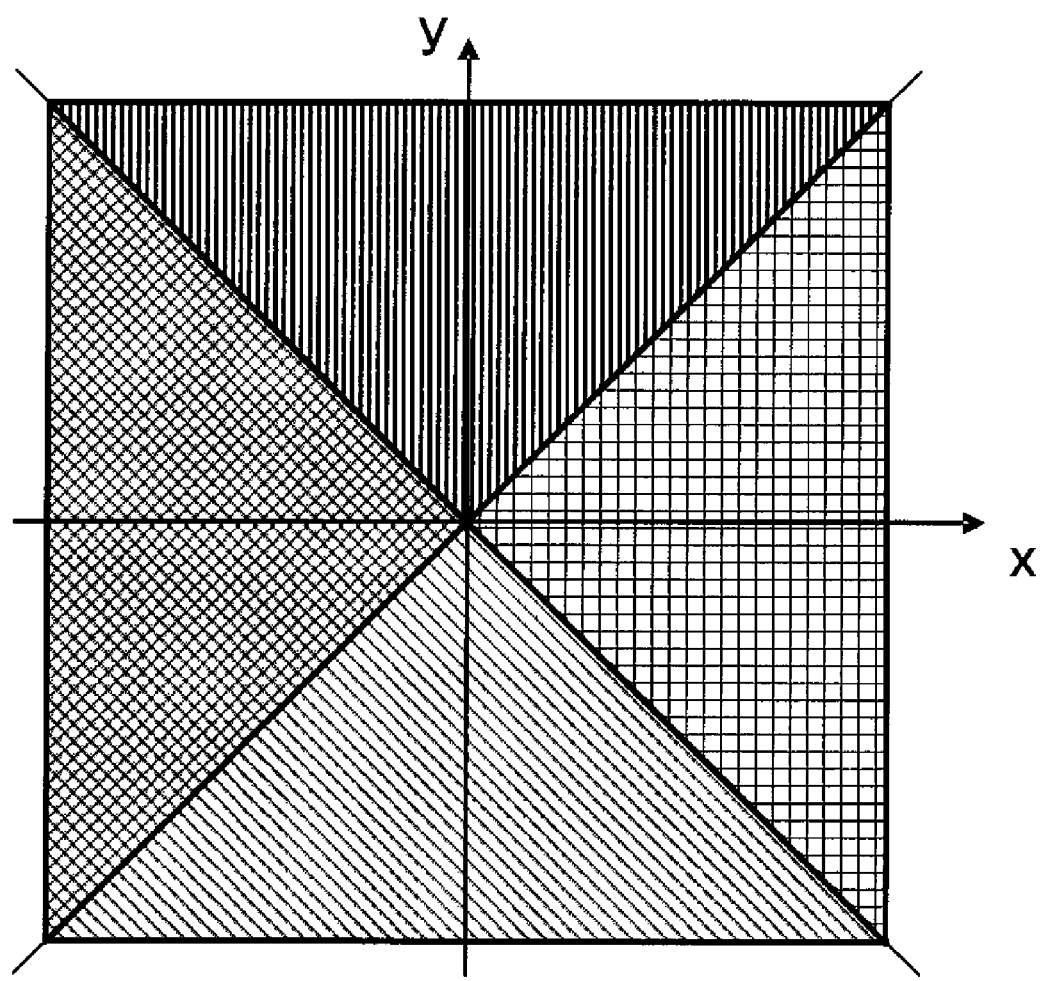
FIG. 18 illustrates an example of a four-part split of the entire area.

FIG. 18 illustrates an example of a four-part split of the entire area. In the example of FIG. 18, the two-dimensional plane in which nodes (not shown) are arranged are split into four regions by four boundary lines extending from the origin of a relative-coordinate system in the directions which respectively make angles of 45, 135, 225, and 315 degrees with the x-axis direction of the relative-coordinate system.

Figure 19:
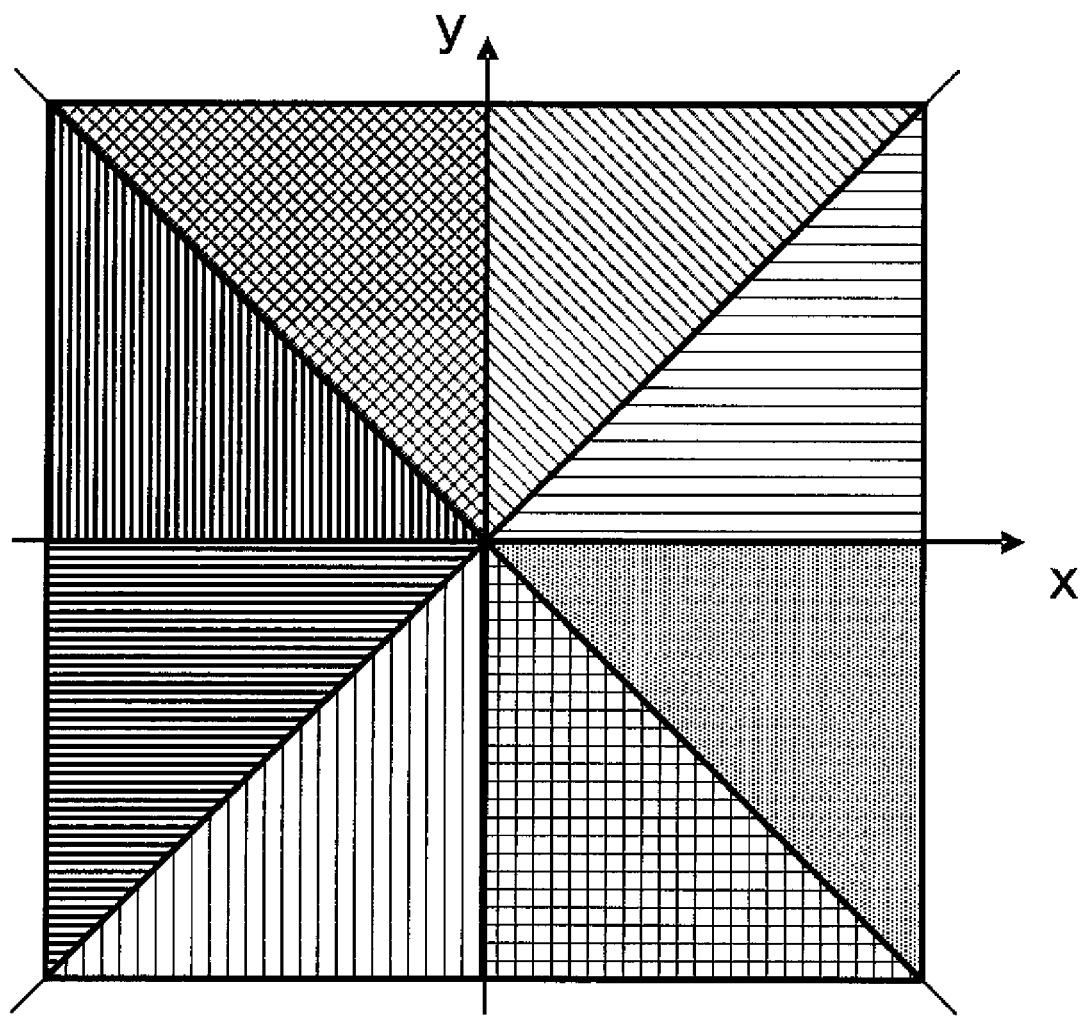
FIG. 19 illustrates an example of an eight-part split of the entire area.

FIG. 19 illustrates an example of an eight-part split of the entire area. In the example of FIG. 19, the two-dimensional plane in which nodes (not shown) are arranged are split into eight regions by eight boundary lines extending from the origin of a relative-coordinate system in the directions which respectively make angles of 0, 45, 90, 135, 180, 225, 270, and 315 degrees with the x-axis direction of the relative-coordinate system.

Figure 20:
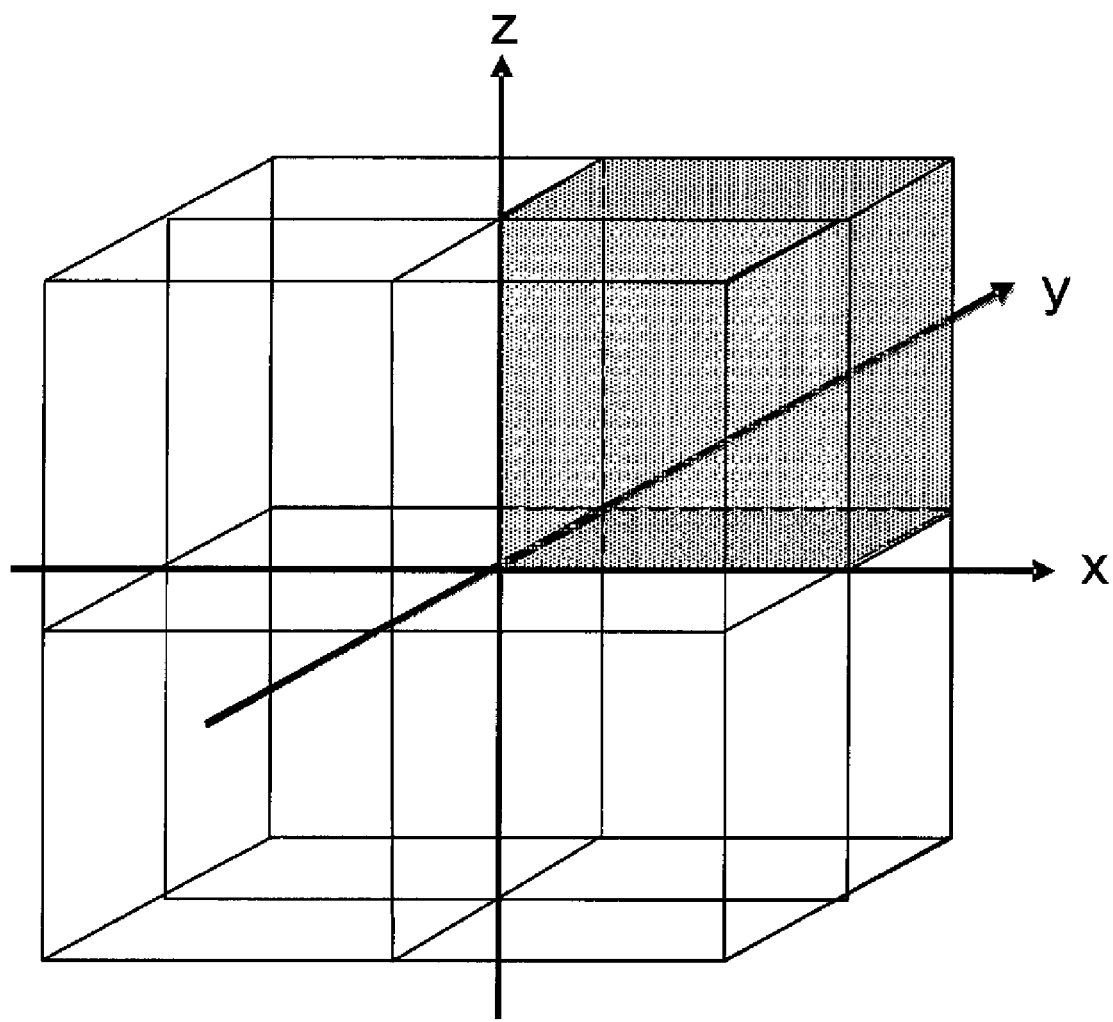
FIG. 20 illustrates a first exemplary split of a three-dimensional space.

FIG. 20 illustrates a first exemplary split of a three-dimensional space. In the example of FIG. 20, the three-dimensional space in which nodes (not shown) are arranged are split into eight regions by the x-y plane, the y-z plane, and the z-x plane of a relative-coordinate system.

Figure 21:
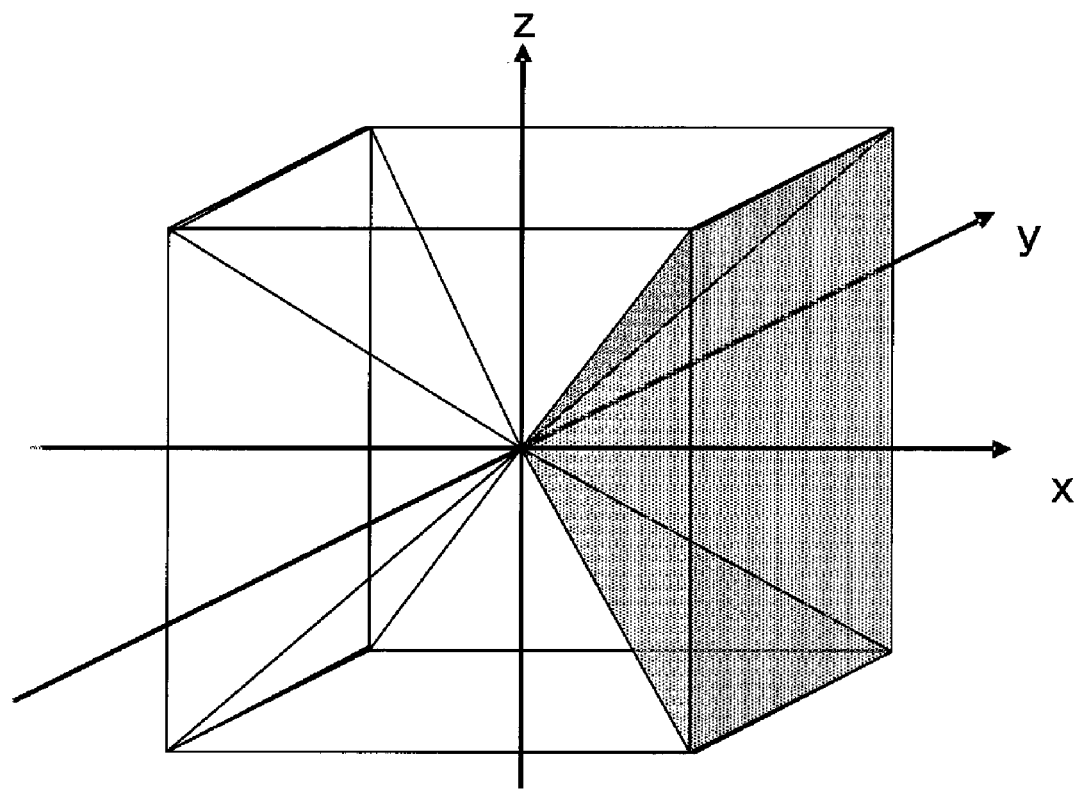
FIG. 21 illustrates a second exemplary split of a three-dimensional space.

FIG. 21 illustrates a second exemplary split of a three-dimensional space. In the example of FIG. 21, the three-dimensional space in which nodes (not shown) are arranged are split into six regions by eight isosceles triangles each having the origin of a relative-coordinate system as an apex and a side of a cubic as a base, where the center of the cubic is located at the origin of the relative-coordinate system.

Although not shown, the torus network to which the techniques explained above can be applied may not be a two-dimensional torus network. The torus network can be one-dimensional (ring) or four- or higher-dimensional. Even in such cases, the multidimensional space can be split into regions by using an extension of the techniques explained for the first and second embodiments.

Recording Medium Storing Program

The processing functions of each of the nodes and the management servers explained above can be realized by a computer. In this case, a program (i.e., a data conversion program) describing details of processing for realizing the functions which each of the nodes and the management servers has is provided. When the computer executes the program, the processing functions of each of the nodes and the management servers can be realized on the computer. The program describing the details of the processing can be stored in a recording medium which can be read by the computer. The recording medium may be a magnetic recording device, an optical disk, an optical magnetic recording medium, a semiconductor memory, or the like. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disk Read Only Memory), a CD-R (Recordable)/RW (ReWritable), or the like. The optical magnetic recording medium may be an MO (Magneto-Optical Disk) or the like.

In order to put the program into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which executes the program stores the program in a storage device belonging to the computer, where the program is originally recorded in, for example, a portable recording medium, or is initially transferred from the server computer. The computer reads the program from the storage device, and performs processing in accordance with the program. Alternatively, the computer may directly read the program from the portable recording medium for performing processing in accordance with the program. Further alternatively, the computer can sequentially execute processing in accordance with each portion of the program every time the portion of the program is transferred from the server computer.

Advantages of Embodiments

According to the embodiments and their variations explained above, the space in which the nodes are arranged is equally split into a plurality of regions according to the direction from the position of a computer (as a source node), at which the origin of a relative coordinate system is placed. Submission of messages to an equal number of nodes in each region is performed in turns within each unit time. Therefore, the numbers of messages addressed to the respective regions and transmitted per unit time in a sequence of collective communication of unique-messages are equated, so that it is possible to reduce the incidence of congestion in transmission lines.

Additional Matters

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiment(s) of the present invention has(have) been described in detail, it should be understood that various changes, substitutions and alterations could be made hereto without departing from the spirit and scope of the invention.

What is claimed is:

1. A non-transitory computer readable recording medium storing a program for performing collective communication of unique-messages by a computer which behaves as one of a plurality of nodes in a torus network, where data unique to each of ones of the plurality of nodes in the torus network other than said one of the plurality of nodes is transmitted to said each of said ones of the plurality of nodes in the collective communication of unique-messages, said program comprising functions of:

a region determination function which acquires said system-configurational information from a configurational-information storage which stores system-configurational information indicating absolute coordinates of each of said plurality of nodes in said torus network, equally splits a space into regions according to directions from an origin of a relative coordinate system on the basis of said system-configurational information, determines one of the regions to which each of the plurality of nodes belongs, on the basis of the relative coordinates of the node, produces regional information indicating the relative coordinates of said each of the plurality of nodes and the region to which said each of the plurality of nodes belongs, and stores the regional information in a regional-information storage, where the origin of the relative coordinate system is placed at a location of said computer;

said regional-information storage which stores said regional information; and a communication execution function which refers to said regional-information storage, and executes submission of messages to said ones of the plurality of nodes in turns in such a manner that the numbers of messages addressed to the respective regions and transmitted per predetermined unit time are equated, and each of the messages transmitted to one of the ones of the plurality of nodes contains data unique to said one of the ones of the plurality of nodes, when said computer receives an instruction to execute collective communication of unique-messages.

2. The recording medium according to claim 1, wherein said program further realizes in said computer, an order determination function determines the order of submission to nodes in each of said regions on the basis of said regional information so that the total numbers of hops to the respective regions per said predetermined unit time are equated, and produces intra-region order information indicating the order of submission to nodes in each of said regions, and an order-information storage which stores said intra-region order information, and said communication execution function refers to said intra-region order information, and submits messages to nodes belonging to each of said regions in the order of submission indicated by the intra-region order information.

3. The recording medium according to claim 2, wherein said order determination function determines the order of submission to nodes in each of said regions by assigning priorities to message submissions to nodes belonging to each of a first half of said regions in ascending order of the number of hops, and assigning priorities to message submissions to nodes belonging to each of a second half of the regions in descending order of the number of hops.

4. The recording medium according to claim 3, wherein said order determination function determines the order of submission to nodes in each of said regions by assigning priorities to message submissions to nodes belonging to one of each pair of adjacent ones of said regions in ascending order of the number of hops, and assigning priorities to message submissions to nodes belonging to the other of said each pair of adjacent ones of the regions in descending order of the number of hops.

5. The recording medium according to claim 2, wherein said region determination function regards said plurality of nodes as being arranged on a two-dimensional plane having first, second, third, and fourth quadrants split by an x-axis and a y-axis of said relative coordinate system in such a manner that first positions of first nodes in the first quadrant are respectively line symmetrical to second positions of second nodes in the second quadrant with respect to the y-axis, the first positions of the first nodes in the first quadrant are respectively point symmetrical to third positions of third nodes in the third quadrant with respect to the origin, and the first positions of the first nodes in the first quadrant are respectively line symmetrical to fourth positions of fourth nodes in the fourth quadrant with respect to the x-axis, and said order determination function determines a first order of submission to the first nodes in the first quadrant by assigning first priorities to message submissions to the first nodes, determines a second order of submission to the second nodes in the second quadrant by provisionally assigning priorities identical to the first priorities to message submissions to the second nodes respectively line symmetrical to the first nodes as provisional priorities of the message submissions to the second nodes and reversing the order of the provisional priorities of the message submissions to the second nodes, determines a third order of submission to third nodes in the third quadrant by provisionally assigning priorities identical to the first priorities to message submissions to the third nodes respectively point symmetrical to the first nodes, and determines a fourth order of submission to fourth nodes in the fourth quadrant by provisionally assigning priorities identical to the first priorities to message submissions to the fourth nodes respectively line symmetrical to the first nodes as provisional priorities of the message submissions to the fourth nodes and reversing the order of the provisional priorities of the message submissions to the fourth nodes.

6. The recording medium according to claim 2, wherein said region determination function regards said plurality of nodes as being arranged on a two-dimensional plane having first, second, third, and fourth quadrants split by an x-axis and a y-axis of said relative coordinate system in such a manner that first positions of first nodes in the first quadrant can be respectively shifted, by parallel movement, to second positions of second nodes corresponding to the first nodes in the second quadrant, to third positions of third nodes corresponding to the first nodes in the third quadrant, and to fourth positions of fourth nodes corresponding to the first nodes in the fourth quadrant, and said order determination function determines a first order of submission to the first nodes in the first quadrant by assigning first priorities to message submissions to the first nodes, determines a second order of submission to the second nodes in the second quadrant by assigning priorities identical to the first priorities to message submissions to the second nodes corresponding to the first nodes, determines a third order of submission to third nodes in the third quadrant by respectively assigning priorities identical to the first priorities to message submissions to the third nodes corresponding to the first nodes, and determines a fourth order of submission to fourth nodes in the fourth quadrant by respectively assigning priorities identical to the first priorities to message submissions to the fourth nodes corresponding to the first nodes.

7. The recording medium according to claim 2, wherein said order determination function determines an order of submission to nodes in one of said regions by determining a provisional order of the nodes in the one of the regions on the basis of the number of hops, and hunting up ones of the nodes in the one of the regions alternately in ascending and descending order of the number of hops.

8. The recording medium according to claim 1, wherein in a case where the number of nodes arranged in said torus network along an axis of said torus network is even, and a boundary between two of said regions is determined by reference to one or more directions from the origin, and one or more of said plurality of nodes are located in the one or more directions, said region determination function determines the one or more of said plurality of nodes to belong to one of the two of the regions.

9. The recording medium according to claim 1, wherein in a case where the number of nodes arranged in said torus network along an axis of said torus network is odd, and a boundary between two of said regions is determined by reference to one or more directions from the origin, and one or more of said plurality of nodes are located in the one or more directions, said region determination function determines each of the one or more of said plurality of nodes to belong to both of the two of the regions.

10. The recording medium according to claim 1, wherein said region determination function regards said plurality of nodes as being arranged on a two-dimensional plane having first, second, third, and fourth quadrants split by an x-axis and a y-axis of said relative coordinate system, and regards the first, second, third, and fourth quadrants as said regions, and the x-axis and the y-axis as boundaries splitting the regions.

11. The recording medium according to claim 1, wherein said program further realizes in said computer an operational-information storage which stores transmission rates of transmission lines each connecting a pair of adjacent ones of said plurality of nodes, and said order determination function acquires the transmission rates from the operational-information storage, determines a virtual hop value of each of the transmission lines which decreases with increase in a transmission rate of said each of the transmission lines, defines as an effective hop count of each of said ones of the plurality of nodes a sum of one or more virtual hop values of one or more transmission lines constituting a route from said computer to said each of the ones of the plurality of nodes, assigns submission priorities to nodes in a first half of said regions in ascending order of the effective hop count, and assigns submission priorities to nodes in a second half of the regions in descending order of the effective hop count.

12. The recording medium according to claim 11, wherein said program further realizes in said computer an operational-information acquiring function which acquires the transmission rates of transmission lines each connecting a pair of adjacent ones of said plurality of nodes from a management server connected to said computer through a network for management, and dynamically updates information in said operational-information storage.

13. A computer having functions of one of a plurality of nodes constituting a torus network, comprising:
 a configurational-information storage which stores system-configurational information indicating absolute coordinates of each of the plurality of nodes belonging to said torus network;
 a processor configured to perform a region determination function which equally splits a space in which said plurality of nodes are arranged, into regions according to directions from an origin of a relative coordinate system on the basis of said system-configurational information, determines one of the regions to which each of the plurality of nodes belongs, on the basis of the relative coordinates of the node, produces regional information indicating the relative coordinates of said each of the plurality of nodes and the region to which said each of the plurality of nodes belongs, and stores the regional information in a regional-information storage, where the origin of the relative coordinate system is placed at a location of said computer;
 said regional-information storage which stores said regional information; and
 a communication execution function which refers to said regional-information storage, and executes submission of messages to ones of the plurality of nodes other than said one of the plurality of nodes in turns in such a manner that the numbers of messages addressed to the respective regions and transmitted per predetermined unit time are equated, and each of the messages transmitted to one of said ones of the plurality of nodes contains data unique to said one of the ones of the plurality of nodes, when said computer receives an instruction to execute collective communication of unique-messages.

14. A process for performing collective communication of unique-messages by a computer which behaves as one of a plurality of nodes in a torus network, where data unique to each of ones of the plurality of nodes in the torus network other than said one of the plurality of nodes is transmitted to said each of the ones of the plurality of nodes in the collective communication of unique-messages, said process comprising:
 storing system-configurational information indicating absolute coordinates of each of said plurality of nodes in said torus network;
 acquiring the stored system-configurational information;
 equally splitting a space in which said plurality of nodes are arranged, into regions according to directions from an origin of a relative coordinate system on the basis of said system-configurational information, where the origin of the relative coordinate system is placed at a location of said computer;
 determining one of the regions to which each of the plurality of nodes belongs, on the basis of the relative coordinates of the node, producing regional information indicating the relative coordinates of said each of the plurality of nodes and the region to which said each of the plurality of nodes belongs, and storing the regional information; and
 referring to the stored regional information, and executing submission of messages to said ones of the plurality of nodes in turns in such a manner that the numbers of messages addressed to the respective regions and transmitted per predetermined unit time are equated, and each of the messages transmitted to one of the ones of the plurality of nodes contains data unique to said one of the ones of the plurality of nodes, when said computer receives an instruction to execute collective communication of unique-messages.

* * * * *